US009092998B2

(12) United States Patent
Masutani et al.

(10) Patent No.: US 9,092,998 B2
(45) Date of Patent: Jul. 28, 2015

(54) METHOD FOR ASSEMBLING APPARATUS INCLUDING DISPLAY SHEET AND APPARATUS INCLUDING DISPLAY SHEET

(75) Inventors: Naoki Masutani, Kyoto (JP); Seiji Nakajima, Kyoto (JP); Tomohiro Fukuhara, Kyoto (JP); Akio Sumiya, Kyoto (JP); Kazuyoshi Nishikawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 656 days.

(21) Appl. No.: 13/360,437

(22) Filed: Jan. 27, 2012

(65) Prior Publication Data

US 2012/0237737 A1 Sep. 20, 2012

(30) Foreign Application Priority Data

Mar. 15, 2011 (JP) ................................ 2011-057280

(51) Int. Cl.
*B32B 7/12* (2006.01)
*G09F 3/10* (2006.01)
*G09F 3/02* (2006.01)

(52) U.S. Cl.
CPC ............ *G09F 3/10* (2013.01); *G09F 2003/025* (2013.01); *Y10T 428/24802* (2015.01)

(58) Field of Classification Search
CPC .......... B32B 7/12; B32B 37/06; B32B 37/14; G09F 3/10
See application file for complete search history.

(56) References Cited

U.S. PATENT DOCUMENTS

| | | | | |
|---|---|---|---|---|
| 5,100,491 | A | 3/1992 | Ijiri et al. | |
| 6,459,460 | B1 | 10/2002 | Yamanaka | |
| 6,741,302 | B2 * | 5/2004 | von Gutfeld et al. | 349/64 |
| 2002/0036897 | A1 | 3/2002 | Nakajima et al. | |
| 2005/0212855 | A1 | 9/2005 | Yokoyama et al. | |
| 2006/0048417 | A1 | 3/2006 | Leykamm | |
| 2007/0202933 | A1 * | 8/2007 | Tolbert et al. | 455/575.1 |
| 2007/0206148 | A1 | 9/2007 | Hara et al. | |
| 2009/0011197 | A1 | 1/2009 | Matsuhira | |
| 2010/0007609 | A1 | 1/2010 | Watabe et al. | |
| 2011/0000712 | A1 | 1/2011 | Kasuga et al. | |
| 2011/0041979 | A1 | 2/2011 | Leykamm | |

FOREIGN PATENT DOCUMENTS

| | | | |
|---|---|---|---|
| CN | 101992872 | A | 3/2011 |
| JP | S5893765 | A | 6/1983 |

(Continued)

OTHER PUBLICATIONS

Extended European Search Report for Application No. 12152646.1, mailed on Jul. 21, 2014 (11 pages).

(Continued)

*Primary Examiner* — Daniel McNally
(74) *Attorney, Agent, or Firm* — Osha Liang LLP

(57) ABSTRACT

A method for assembling an apparatus including a display sheet having a non-transparent part in at least a part of the display sheet, has a bonding step of bonding the display sheet to a housing. The bonding step has a first step of attaching the display sheet to the housing via a UV curable adhesive, and a second step of causing an ultraviolet light emitting apparatus to irradiate, from an external surface side of the display sheet. The display sheet is attached to the housing with ultraviolet light after the first step so that the ultraviolet light passes through at least a part of the non-transparent part of the display sheet and cures the UV curable adhesive.

8 Claims, 19 Drawing Sheets

(56) References Cited

FOREIGN PATENT DOCUMENTS

| | | | |
|---|---|---|---|
| JP | S6069180 | A | 4/1985 |
| JP | S61278584 | A | 12/1986 |
| JP | H0360733 | A | 3/1991 |
| JP | H05-87774 | U | 11/1993 |
| JP | 06-161356 | A | 6/1994 |
| JP | H11289169 | A | 10/1999 |
| JP | 2001-337607 | A | 12/2001 |
| JP | 2002-100887 | A | 4/2002 |
| JP | 2003-149655 | A | 5/2003 |
| JP | 2003-242854 | A | 8/2003 |
| JP | 2003-327933 | A | 11/2003 |
| JP | 2004-208046 | A | 7/2004 |
| JP | 2005-019264 | A | 1/2005 |
| JP | 2005-167788 | A | 6/2005 |
| JP | 2005-279942 | A | 10/2005 |
| JP | 2006-264264 | A | 10/2006 |
| JP | 2007-233160 | A | 9/2007 |
| JP | 2007-273304 | A | 10/2007 |
| JP | 2008-185870 | A | 8/2008 |
| JP | 2008-212435 | A | 9/2008 |
| JP | 2008-233590 | A | 10/2008 |
| JP | 2009-008703 | A | 1/2009 |
| JP | 2009-108314 | A | 5/2009 |
| JP | 2009-177793 | A | 8/2009 |
| JP | 2010-020574 | A | 1/2010 |
| JP | 2010-026255 | A | 2/2010 |
| JP | 2010-062285 | A | 3/2010 |
| JP | 2010-096968 | A | 4/2010 |
| WO | 88/10213 | A1 | 12/1988 |

OTHER PUBLICATIONS

Office Action issued in corresponding Japanese Application No. 2011-057280, mailed Sep. 2, 2014 (10 pages).
Office Action in counterpart Chinese Patent Application No. 201210020653.7 issued Jan. 22, 2014 (16 pages).

* cited by examiner

Fig. 6 ( a )
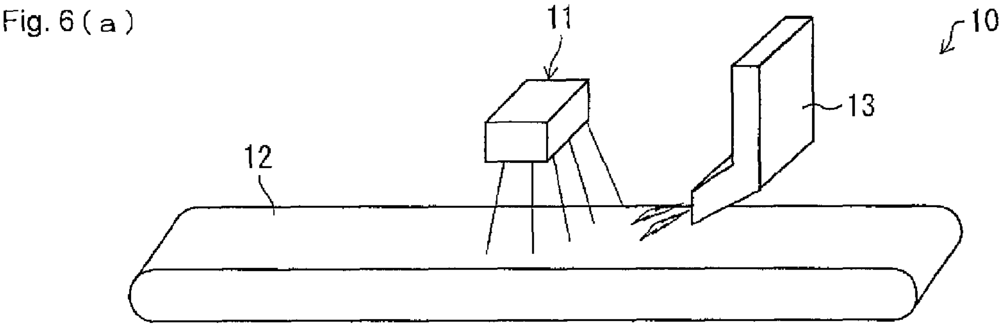
Fig. 6 ( b )
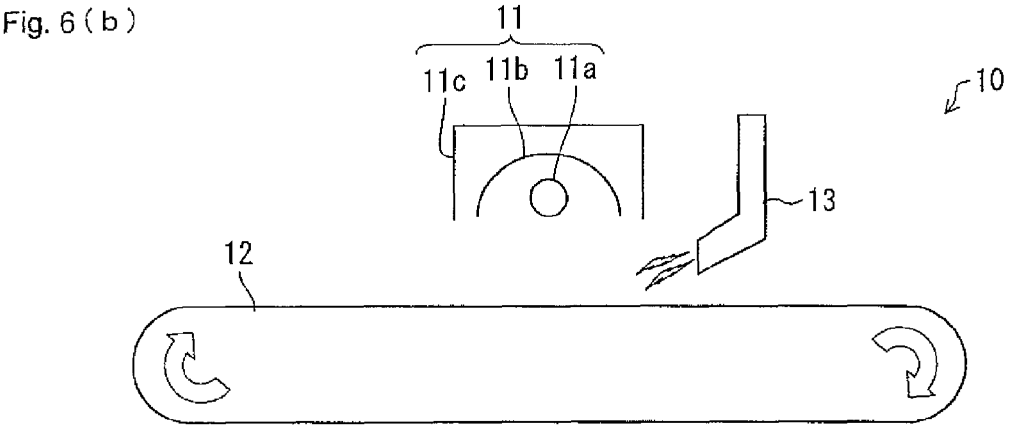
Fig. 6 ( c )
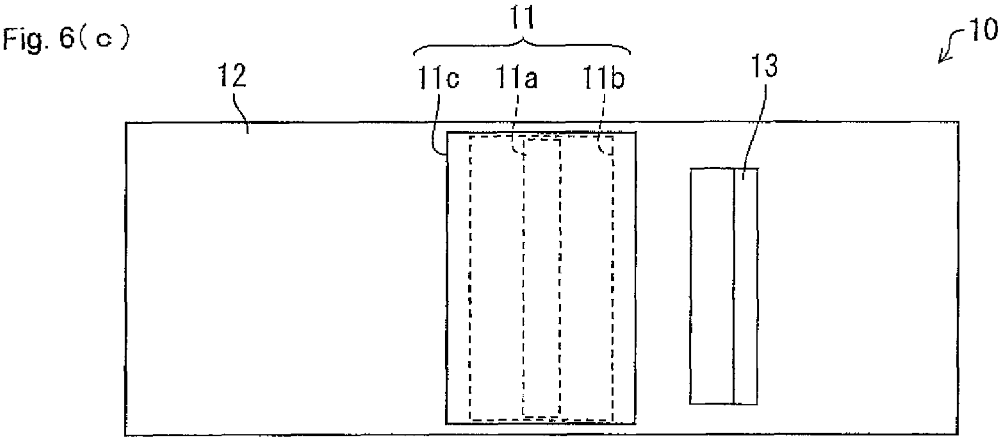

Fig. 17 ( a )
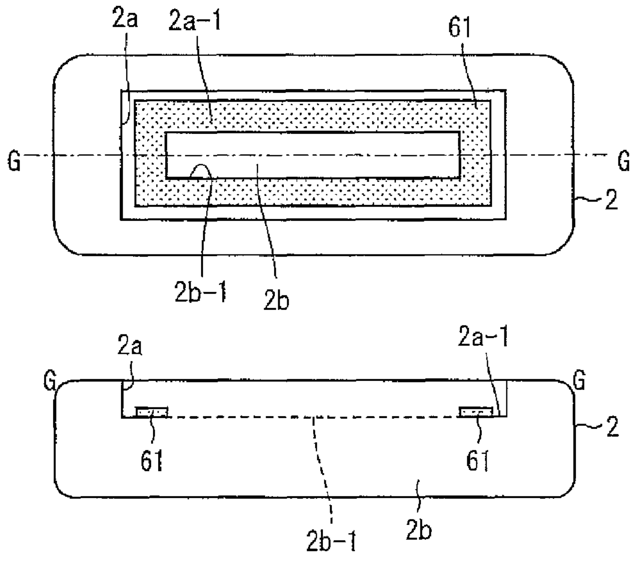
Fig. 17 ( b )
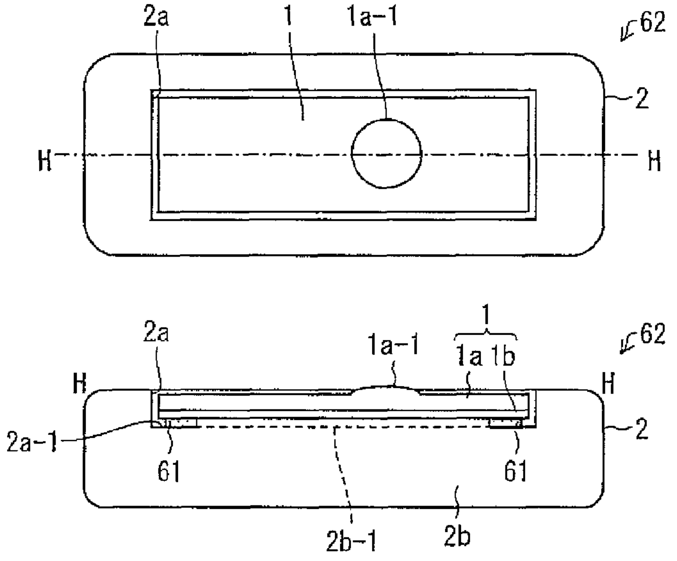
Fig. 17 ( c )
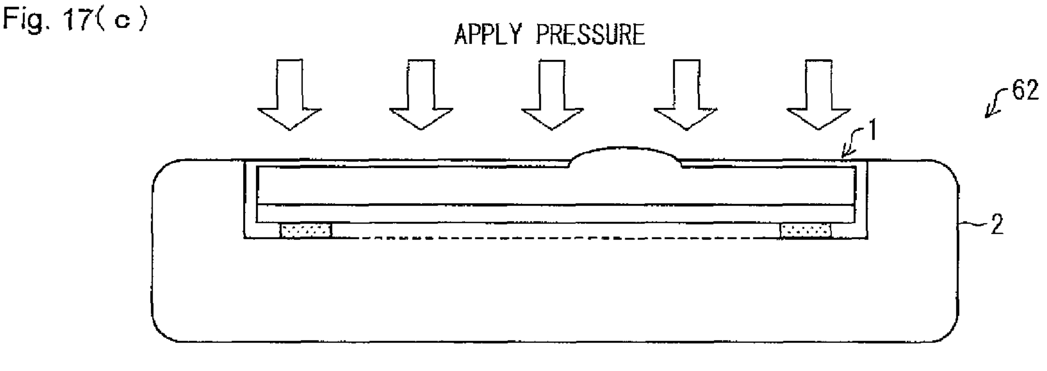

METHOD FOR ASSEMBLING APPARATUS INCLUDING DISPLAY SHEET AND APPARATUS INCLUDING DISPLAY SHEET

This Nonprovisional application claims priority under 35 U.S.C. §119(a) on Patent Application No. 2011-057280 filed in Japan on Mar. 15, 2011, the entire contents of which are hereby incorporated by reference.

BACKGROUND OF THE INVENTION

1. Technical Field

The present invention relates to a method for assembling an apparatus by bonding a display sheet such as an identification plate to a housing of the apparatus.

2. Background Art

A display sheet such as an identification plate is often bonded to a housing (=cabinet: refers to "outer shell" including a case, a package, a housing, a box, an enclosure, and the like) of an apparatus such as an electronic component for the purpose of displaying a product name, a trademark, characters, a product number, design, etc.

In addition, such a display sheet is often bonded to a housing for the design purpose of visually concealing an inner structure of an apparatus and thereby improving appearance of the apparatus.

For example, Patent Literature 1 describes, as a commonly-used technique, a technique of bonding a decoration-designed label to an entire surface of a card-like receiver.

As illustrated in FIG. 19, the label 100 includes (i) a transparent sheet-like substrate 101 (thickness: 0.1 mm to 0.2 mm) made of a flexible material such as polycarbonate or polyester, (ii) a print part 102 on which the decoration design is printed, and (iii) an adhesive part 103 such as a double-sided adhesive tape. The print part 102 and the adhesive part 103 are provided on the transparent sheet-like substrate 101. In a case 104 whose one side is opened, a metal panel and an insulating panel 106 are stored in a combined manner, and the label 100 is bonded to surfaces of these components via the adhesive part 103.

Patent Literatures 2 through 9 also disclose that a display member such as an identification plate or a display device and other members are bonded to a base member such as a main body or a housing via a double-sided adhesive tape.

Moreover, there is a method of bonding a display member to a base member with the use of a thermosetting adhesive. Patent Literature 10 discloses that an optical member is fixed to a substrate with the use of a thermosetting adhesive layer. Patent Literature 11 discloses that a lid member covering a through-hole is fixed with the use of a mixed resin of a thermosetting resin and a thermoplastic resin.

Patent Literatures 10, and 12 through 17 each disclose a method of bonding a transparent member to a base member with the use of a UV curable adhesive or a photocurable adhesive.

Patent Literature 16 discloses a key sheet 200 with illuminated resin key tops. As illustrated in FIG. 20, the key sheet 200 is arranged such that a resin key top 201 having a punched-out character-shaped display part 202 provided on a rear surface of the resin key top 201 is fixed to a surface of a rubber-like elastic key sheet 203 via a fixing part 204.

The display part 202 is constituted by a light-transmitting part 202*a* which transmits light and a light blocking part 202*b* which blocks light. The fixing part 204 has light transmittance, and is formed, for example, by irradiating a UV curable acrylic resin adhesive with ultraviolet light.

Furthermore, Patent Literature 18 discloses assembly using a waterproof elastic sheet or an elastic adhesive, Patent Literature 19 discloses assembly utilizing laser welding, and Patent Literature 20 discloses bonding using a highly water-resistant adhesive sheet.

CITATION LIST

Patent Literature 1

Japanese Patent Application Publication, Tokukaihei, No. 6-161356 A (Publication Date: Jun. 7, 1994)

Patent Literature 2

Japanese Patent Application Publication, Tokukai, No. 2010-20574 A (Publication Date: Jan. 28, 2010)

Patent Literature 3

Japanese Patent Application Publication, Tokukai, No. 2010-26255 A (Publication Date: Feb. 4, 2010)

Patent Literature 4

Japanese Patent Application Publication, Tokukai, No. 2009-108314 A (Publication Date: May 21, 2009)

Patent Literature 5

Japanese Patent Application Publication, Tokukai, No. 2009-177793 A (Publication Date: Aug. 6, 2009)

Patent Literature 6

Japanese Patent Application Publication, Tokukai, No. 2008-233590 A (Publication Date: Oct. 2, 2008)

Patent Literature 7

Japanese Patent Application Publication, Tokukai, No. 2005-167788 A (Publication Date: Jun. 23, 2005)

Patent Literature 8

Japanese Patent Application Publication, Tokukai, No. 2002-100887 A (Publication Date: Apr. 5, 2002)

Patent Literature 9

Japanese Patent Application Publication, Tokukai, No. 2007-273304 A (Publication Date: Oct. 18, 2007)

Patent Literature 10

Japanese Patent Application Publication, Tokukai, No. 2008-185870 A (Publication Date: Aug. 14, 2008)

Patent Literature 11

Japanese Patent Application Publication, Tokukai, No. 2010-62285 A (Publication Date: Mar. 18, 2010)

Patent Literature 12

Japanese Patent Application Publication, Tokukai, No. 2009-8703 A (Publication Date: Jan. 15, 2009)

Patent Literature 13

Japanese Patent Application Publication, Tokukai, No. 2003-149655 A (Publication Date: May 21, 2003)

Patent Literature 14

Japanese Patent Application Publication, Tokukai, No. 2010-96968 A (Publication Date: Apr. 30, 2010)

Patent Literature 15

Japanese Patent Application Publication, Tokukai, No. 2007-233160 A (Publication Date: Sep. 13, 2007)

Patent Literature 16

Japanese Patent Application Publication, Tokukai, No. 2003-242854 A (Publication Date: Aug. 29, 2003)

Patent Literature 17

Japanese Patent Application Publication, Tokukai, No. 2001-337607 A (Publication Date: Dec. 7, 2001)

Patent Literature 18

Japanese Patent Application Publication, Tokukai, No. 2004-208046 A (Publication Date: Jul. 22, 2004)

Patent Literature 19

Japanese Patent Application Publication, Tokukai, No. 2008-212435 A (Publication Date: Sep. 18, 2008)

Patent Literature 20

Japanese Patent Application Publication, Tokukai, No. 2003-327933 A (Publication Date: Nov. 19, 2003)

SUMMARY

However, the conventional methods for assembling an apparatus by bonding a display sheet to a housing of the apparatus function as follows.

Specifically, a method of bonding a display sheet to a housing with the use of a double-sided adhesive tape causes the following. The method mainly depends on manual operation, and automation of the operation is difficult. This means low working efficiency, thereby leading to low productivity (throughput). For example, such a method requires an operation of manually processing the double-sided adhesive tape into a size and a shape corresponding to an area to which the double-sided adhesive tape is to be attached and attaching the double-sided adhesive tape to the area.

In addition, this method requires an operation of applying a pressure to the attached display sheet with the use of a pressure machine in order to increase adhesion. This necessitates alignment of a working position of the pressure machine, etc., thereby causing a decline in productivity.

The process of manually attaching the double-sided adhesive tape results in a variation in processing accuracy of the double-sided adhesive tape and in position to which the double-sided adhesive tape is attached, thereby causing a variation in display sheet bonding quality.

The costs such as material cost and processing cost become high.

The application of this method to a base member having a shape other than a flat surface is difficult. For example, it is difficult to attach the double-sided adhesive tape to the vicinity of an acute-angled part of a base member having an acute angle.

It may be difficult to secure waterproofness in a portion to which the display sheet is bonded via a double-sided adhesive tape.

Moisture absorption, dissolution, and outgassing of an adhesive component of the double-sided adhesive tape may also occur.

Since the double-sided adhesive tape generally has a large thickness, bulge of the display sheet and a large distance between a top surface of the display sheet and an inside of the housing cause troubles.

The bulge of the display sheet disfigures an apparatus since there is a distance between the top surface of the display sheet and a top surface of a surrounding portion of the housing. Alternatively, the bulge of the display sheet undesirably necessitates a structure in which an area to which the display sheet is to be bonded is largely recessed towards the inside of the housing so that the top surface of the display sheet becomes even with the top surface of the surrounding portion of the housing.

In a case where, for example, the display sheet has a switch dome that is operatively connected to electrical contacts inside the housing, the large distance between the top surface of the display sheet and the inside of the housing undesirably makes a user feel a sense of strangeness when clicking the switch dome and causes a decline in degree of contact between the electrical contacts.

Meanwhile, the method of bonding a display sheet to a housing with the use of an adhesive, such as a thermosetting adhesive, which requires a heating process causes the following. It may take time to thermally set the adhesive, thereby causing a decline in productivity.

The members to be heated are required to have heat resistance since a thermal load is applied to the members. In particular, a display sheet often includes a low heat resistant (thermoplastic) film such as a PET resin (polyethylene terephthalate resin), polyethylene (PE), polyvinylchloride (PVC), polystyrene (PS), or methacrylate resin (PMMA). Accordingly, necessity of using an expensive highly heat resistant sheet is a great disadvantage to production.

There may be a restriction on a working life (so-called pot life) of the adhesive since the adhesive gradually dries/hardens and cannot be used for the adhering process unless the bonding process is finished within a predetermined period of time from the application of the adhesive.

The UV curable adhesive and the photocurable adhesive disclosed in Patent Literature 10, and 12 through 17 are used by irradiating the adhesive with ultraviolet light or light through a transparent member.

A general apparatus such as a stopwatch or a timer is covered with a non-transparent material so that the inside of the apparatus cannot be viewed, except for a portion (e.g., display window) through which an image is displayed for a viewer from an inside the apparatus. Moreover, a large part of a display sheet such as an identification plate also is generally made up of a non-transparent part as a whole.

The non-transparent part of the display sheet is generally constituted by an ink layer that is applied/printed onto a transparent sheet. Accordingly, conventionally, only way to bond a display sheet to a housing with the use of a UV curable adhesive was to additionally provide a region for transmission of ultraviolet light although presence of such a region contradicts original functions of the display sheet.

One or more embodiments of the present invention provides (i) a method for assembling an apparatus including a display sheet which makes it possible to assemble an apparatus by bonding a display sheet to a housing with high efficiency and high quality at low cost by utilizing characteristics of the display sheet and (ii) an apparatus including a display sheet.

A method according to one or more embodiments of the present invention for assembling an apparatus including a display sheet, includes the step of (a) bonding the display sheet having a non-transparent part in at least a part of the display sheet to a housing, the step (a) including: a first step of attaching the display sheet to the housing via a UV curable adhesive; and a second step of causing an ultraviolet light emitting apparatus to irradiate, from an external surface side of the display sheet, the display sheet attached to the housing with ultraviolet light after the first step so that the ultraviolet light passes through at least a part of the non-transparent part of the display sheet and cures the UV curable adhesive.

According to one or more embodiments of the invention, in the second step, the UV curable adhesive is cured by (i) causing the ultraviolet light emitting apparatus to irradiate, from the external surface side of the display sheet, the display sheet attached to the housing with ultraviolet light and (ii) causing the ultraviolet light to pass through at least a part of the non-transparent part of the display sheet.

Since the display sheet is bonded to the housing by causing the ultraviolet light to pass through the non-transparent part and cure the UV curable adhesive, it is possible to reduce the number of steps depending on manual operation, thereby making it possible to easily carry out the bonding step in a very short period of time. Moreover, since the step is easily carried out, high bonding quality can be achieved stably. This makes it possible to prevent damage on a part of the display sheet (e.g., embossed part) provided for improvement of appearance. Further, it is possible to hold down the material cost and the processing cost. Furthermore, since the UV curable adhesive is used, it is easy to secure waterproofness of an area to which the display sheet is bonded. Further, since the UV curable adhesive turns into a cured product, there is little risk of causing troubles such as moisture absorption, dissolution, and outgassing.

Furthermore, since the thickness of the UV curable adhesive can be made very thin unlike the double-sided adhesive tape, it is possible to improve appearance. Moreover, since the UV curable adhesive is in a liquid form before it is applied, an area to which the UV curable adhesive is applied can have a wide variety of shapes. Accordingly, the display sheet can be stably bonded regardless of the shape of the display sheet. Further, even if the display sheet does not have heat resistance, i.e., is thermoplastic, only a thermal load of the ultraviolet light emission from the light source is applied to the display sheet. Accordingly, the thermal load applied to the display sheet is much lower than a thermal load applied to a thermosetting adhesive. This allows use of a general film as a base material layer of the display sheet.

It is thus possible to provide a method for assembling an apparatus including a display sheet, which method makes it possible to assemble an apparatus by bonding a display sheet to a housing at low cost with high efficiency and high quality by utilizing characteristics of the display sheet.

An apparatus according to one or more embodiments of the present invention which includes a display sheet having a non-transparent part in at least a part of the display sheet, the apparatus being assembled by bonding the display sheet to a housing, the display sheet being attached to the housing via a UV curable adhesive, and the display sheet attached to the housing being irradiated, from an external surface side of the display sheet, with ultraviolet light so that the ultraviolet light passes through at least a part of the non-transparent part of the display sheet and cures the UV curable adhesive, which allows the display sheet to be bonded to the housing.

According to one or more embodiments of the invention, it is possible to provide a high-quality apparatus with good appearance which includes a high-quality display sheet that is efficiently bonded to a housing at low cost.

As described above, a method according to one or more embodiments of the present invention for assembling an apparatus including a display sheet, includes the step of (a) bonding the display sheet having a non-transparent part in at least a part of the display sheet to a housing, the step (a) including: a first step of attaching the display sheet to the housing via a UV curable adhesive; and a second step of causing an ultraviolet light emitting apparatus to irradiate, from an external surface side of the display sheet, the display sheet attached to the housing with ultraviolet light after the first step so that the ultraviolet light passes through at least a part of the non-transparent part of the display sheet and cures the UV curable adhesive.

It is thus possible to provide a method for assembling an apparatus including a display sheet, which method makes it possible to assemble an apparatus by bonding a display sheet to a housing at low cost with high efficiency and high quality by utilizing characteristics of the display sheet.

As described above, an apparatus according to one or more embodiments of the present invention which includes a display sheet having a non-transparent part in at least a part of the display sheet, the apparatus being assembled by bonding the display sheet to a housing, the display sheet being attached to the housing via a UV curable adhesive, and the display sheet attached to the housing being irradiated, from an external surface side of the display sheet, with ultraviolet light so that the ultraviolet light passes through at least a part of the non-transparent part of the display sheet and cures the UV curable adhesive, which allows the display sheet to be bonded to the housing.

According to one or more embodiments of the invention, it is possible to provide a high-quality apparatus with good appearance which includes a high-quality display sheet that is efficiently bonded to a housing at low cost.

BRIEF DESCRIPTION OF THE DRAWINGS

FIG. 6 shows an embodiment of the present invention, FIG. 6 (*a*) is a perspective view illustrating a configuration of an ultraviolet light emitting apparatus, FIG. 6 (*b*) is a side view of the ultraviolet light emitting apparatus, and FIG. 6 (*c*) is a top view of the ultraviolet light emitting apparatus.

(*b*) is a cross-sectional view explaining a phenomenon in which a heated air inside the processed member expands and presses up the display sheet.

FIG. 13 shows an embodiment of the present invention, FIG. 13 (*a*) shows a plan view and a cross-sectional view each illustrating a state in which the UV curable adhesive is applied to the housing, FIG. 13 (*b*) shows a plan view and a cross-sectional view each illustrating a state of a processed member produced by attaching the display sheet to the housing of FIG. 13 (*a*), FIG. 13 (*c*) is a diagram explaining a step of cooling the processed member of FIG. 13 (*b*), and FIG. 13 (*d*) shows a side view and a plan view each explaining a step of causing the ultraviolet light emitting apparatus to irradiate the display sheet of the processed member cooled in FIG. 13 (*c*) with ultraviolet light.

Figure 14:
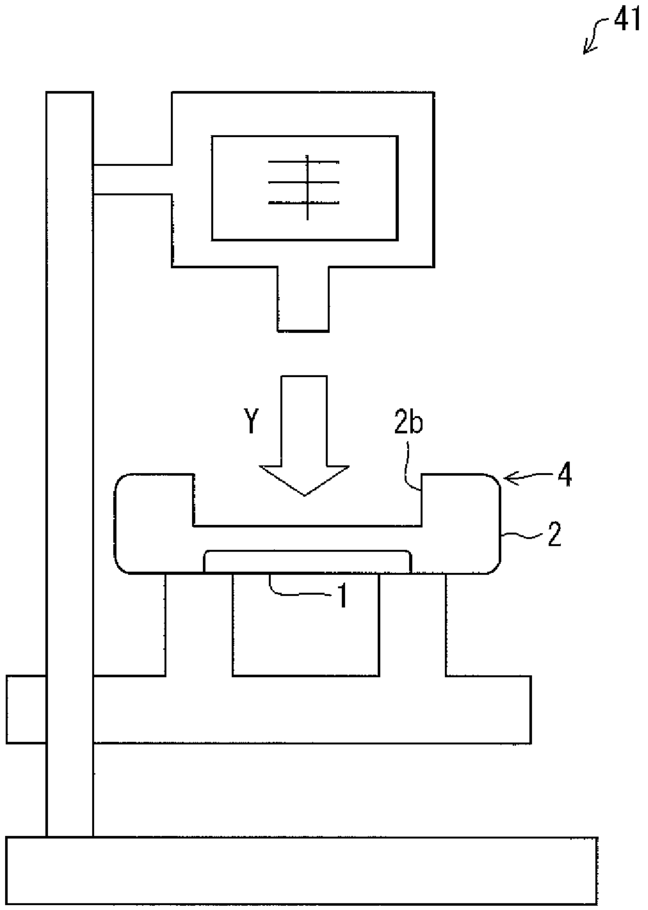

FIG. 14 shows an embodiment of the present invention, and is a diagram explaining a method for performing a sample display sheet peel strength test.

Figure 15:
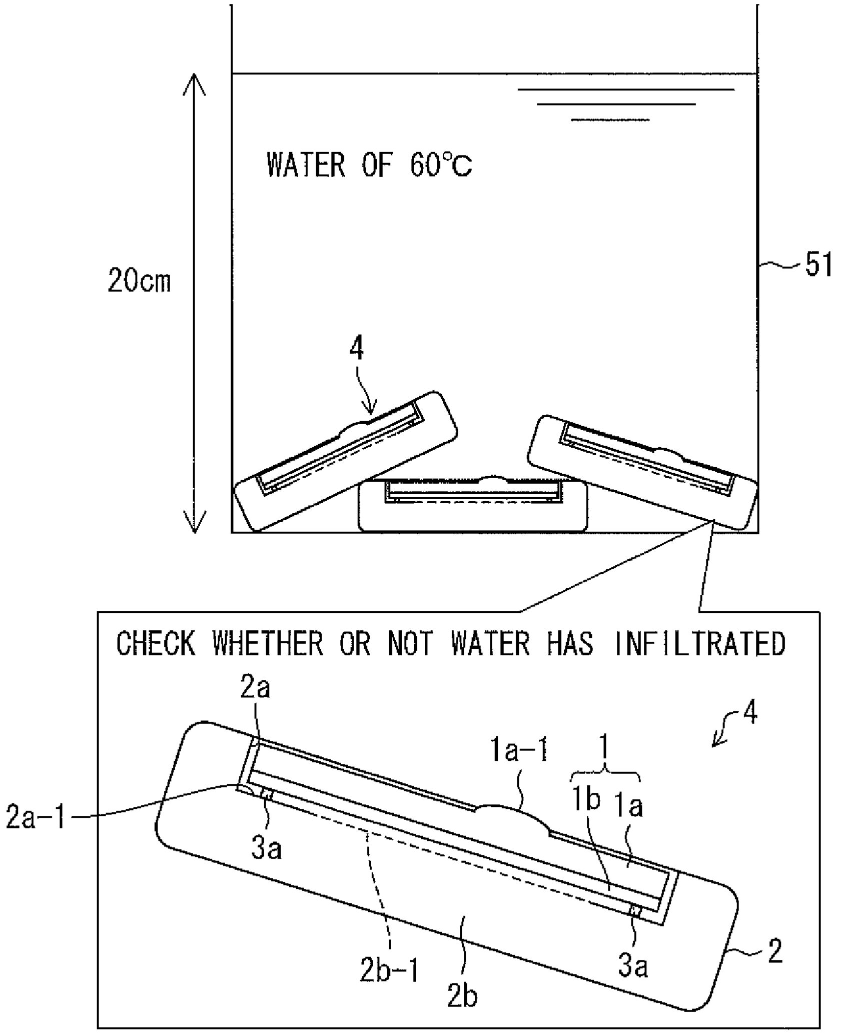

FIG. 15 shows an embodiment of the present invention, and is a diagram explaining a method for performing a sample airtightness (waterproofness) evaluation test.

Figure 16:
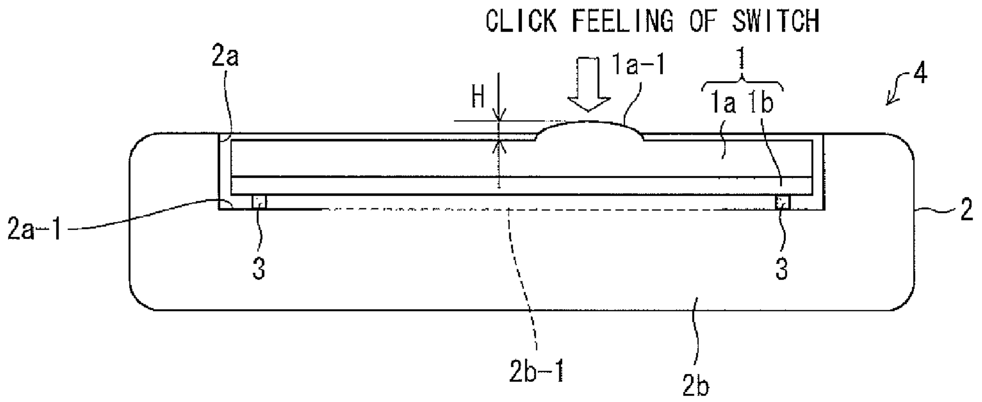

FIG. 16 shows an embodiment of the present invention, and is a diagram explaining a method for evaluating appearance and click feeling of a switch dome of the sample.

FIG. 17 shows an embodiment of the present invention, FIG. 17 (*a*) shows a plan view and across-sectional view each explaining a step of bonding a double-sided adhesive tape to a housing, FIG. 17 (*b*) shows a plan view and a cross-sectional view each illustrating a state of a processed member produced by attaching a display sheet to the housing of FIG. 17 (*a*), and FIG. 17 (*c*) shows a diagram explaining a step of applying pressure to the processed member of FIG. 17 (*b*).

Figure 18A:
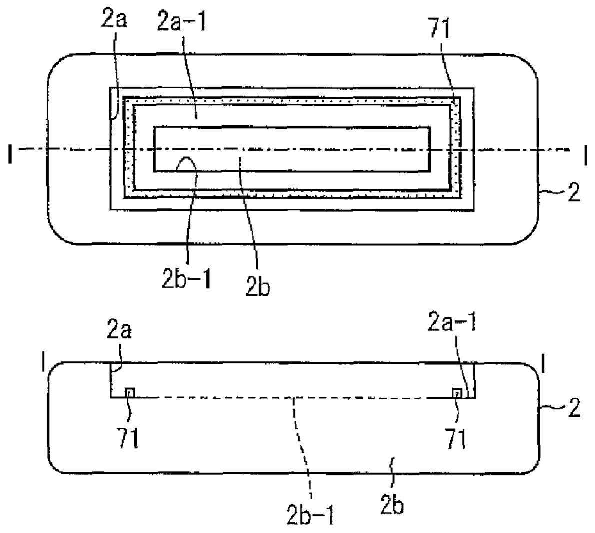
Figure 18B:
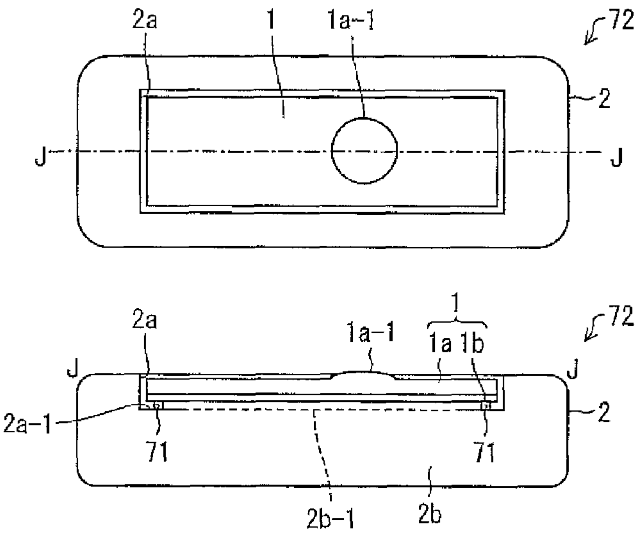
Figure 18C:
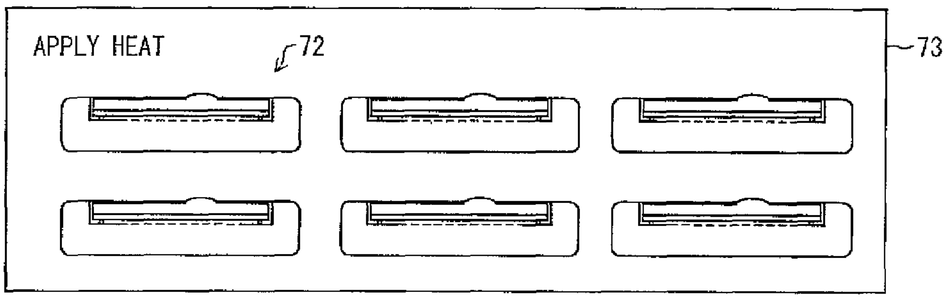

FIG. 18 shows an embodiment of the present invention, FIG. 18 (*a*) shows a plan view and across-sectional view each explaining a step of applying a thermosetting adhesive to a housing, FIG. 18 (*b*) shows a plan view and a cross-sectional view each illustrating a state of a processed member produced by attaching a display sheet to the housing of FIG. 18 (*a*), and FIG. 18 (*c*) shows a diagram explaining a step of applying heat to the processed member of FIG. 18 (*b*).

Figure 19:
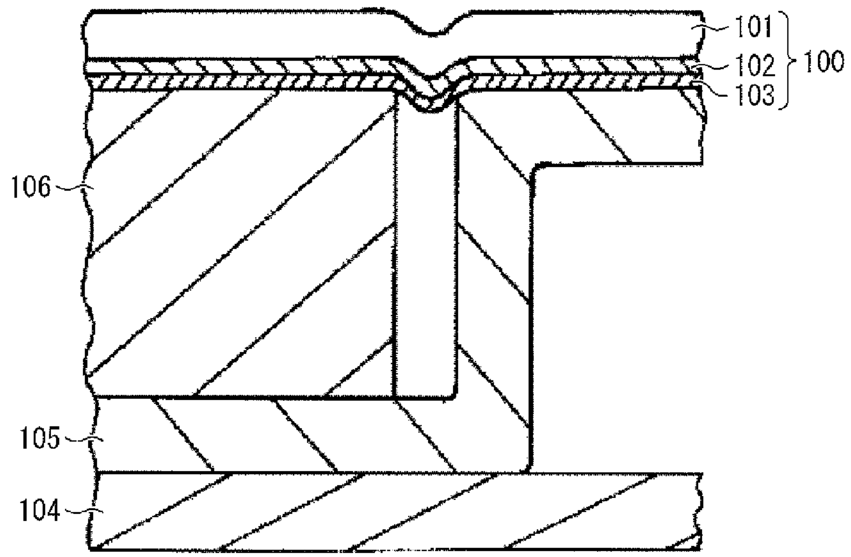

FIG. 19 shows a conventional art, and is a cross-sectional view illustrating a state in which a display sheet is bonded to a housing with the use of a double-sided adhesive tape.

Figure 20:
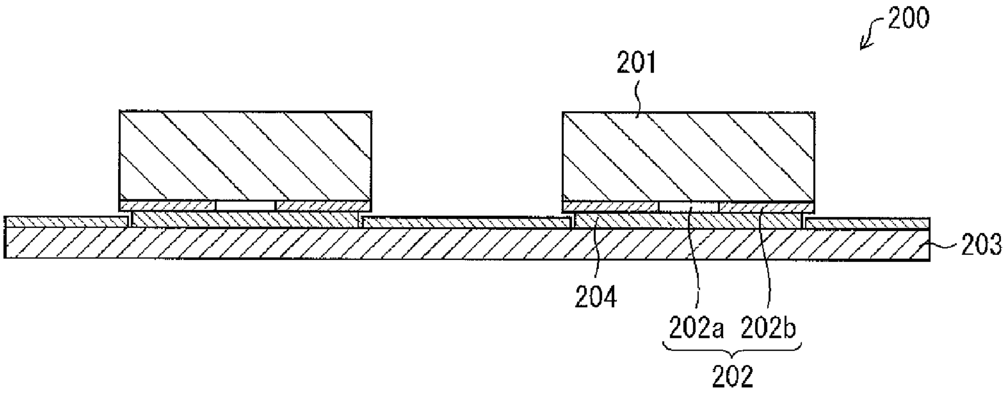

FIG. 20 is a cross-sectional view illustrating a state in which a transparent member is bonded to a housing with the use of a UV curable adhesive.

DETAILED DESCRIPTION

Embodiments of the present invention are described below with reference to FIGS. 1 through 18. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 2A:
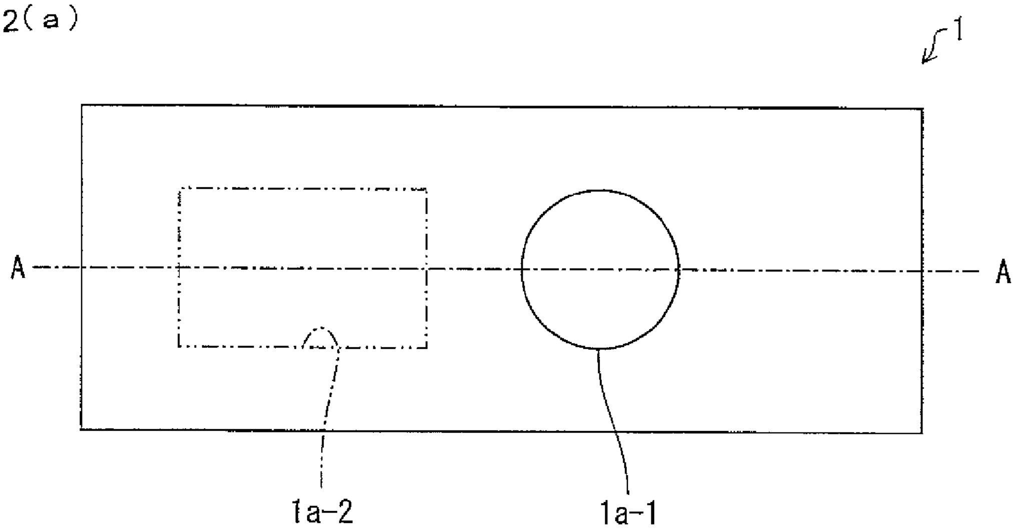
FIG. 2 shows an embodiment of the present invention, FIG. 2 (*a*) is a plan view of the display sheet, and FIG. 2 (*b*) is a cross-sectional view taken along the line A-A of FIG. 2 (*a*).
Figure 2B:
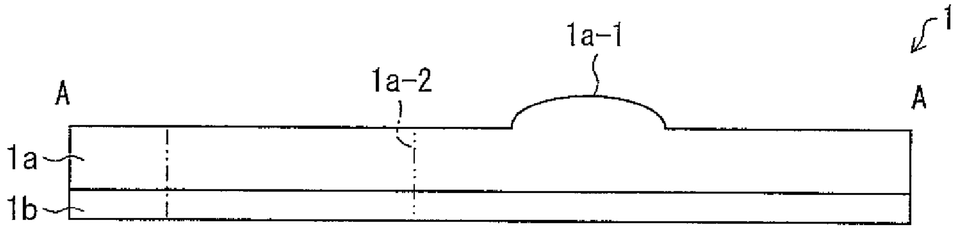

FIG. 2 illustrates a configuration of a display sheet 1 to be used in a bonding step to a housing in the present embodiment. The bonding step is a step constituting an assembling process for assembling an apparatus including the housing. FIG. 2 (*a*) is a plan view of the display sheet 1, and FIG. 2 (*b*) is a cross-sectional view of the display sheet 1 taken along the A-A line which is a central line.

The display sheet 1 includes a base material layer 1*a*, which is, for example, a PET (polyethylene terephthalate) film, and an ink layer 1*b*. The base material layer 1*a* is provided with a switch dome 1*a*-1 which bulges in a button-like manner. When the switch dome 1*a*-1 is pressed, the switch dome 1*a*-1 is deformed so as to be recessed towards the inside, so that electrical contacts provided in the housing 2 make contact with each other.

The ink layer 1*b* is a layer which constitutes a non-transparent part of the display sheet 1. The ink layer 1*b* is, for example, applied or printed on the base material layer 1*a*.

The expression "non-transparent" used herein means that transmittance to light having a wavelength ranging from 200 nm to 800 nm, which encompasses a ultraviolet light region and a visible light region, is 70% or lower at which transparency can be generally deemed to be lost.

The ink layer 1*b* has transmittance larger than zero to at least a part of the wavelength range of ultraviolet light. In the present embodiment, the ink layer 1*b* is, for example, made of a typical material whose ultraviolet light transmittance to at least a part of the wavelength range of ultraviolet light falls in a range from 3% to 50%, which achieves both curing of a UV curable adhesive and good appearance (concealing effect).

Use of the ink layer 1*b* made of such a typical material makes it possible to easily prepare a display sheet according to the present embodiment, i.e., a display sheet suitable for use of a UV curable adhesive.

The base material layer 1*a* is not limited to a PET film, and can be film made of polyethylene (PE), polyvinylchloride (PVC), polystyrene (PS), methacrylate resin (PMMA) or the like. These films exhibit thermoplasticity (low heat resistance), but a film that does not exhibit thermoplasticity (low heat resistance) may be used as the base material layer 1*a*.

In the present embodiment, a PET film having a thickness of 300 μm was used as the base material layer 1*a*, and white ink was used as the ink layer 1*b*. In the present embodiment, SSS-611 produced by TOYO INK CO., LTD. was used as the white ink, but color and material of the ink layer 1*b* are not limited in particular. A height (bump height) of the switch dome before the bonding step was set to various values within a range from 500 μm to 1000 μm.

As shown by the virtual lines in FIGS. 2 (*a*) and (*b*), the display sheet 1 may be provided with a window 1*a*-2 for display section through which a display section such as a liquid crystal display section of a housing is exposed to an outside in a state in which the display sheet 1 is bonded to the housing.

Figure 3A:
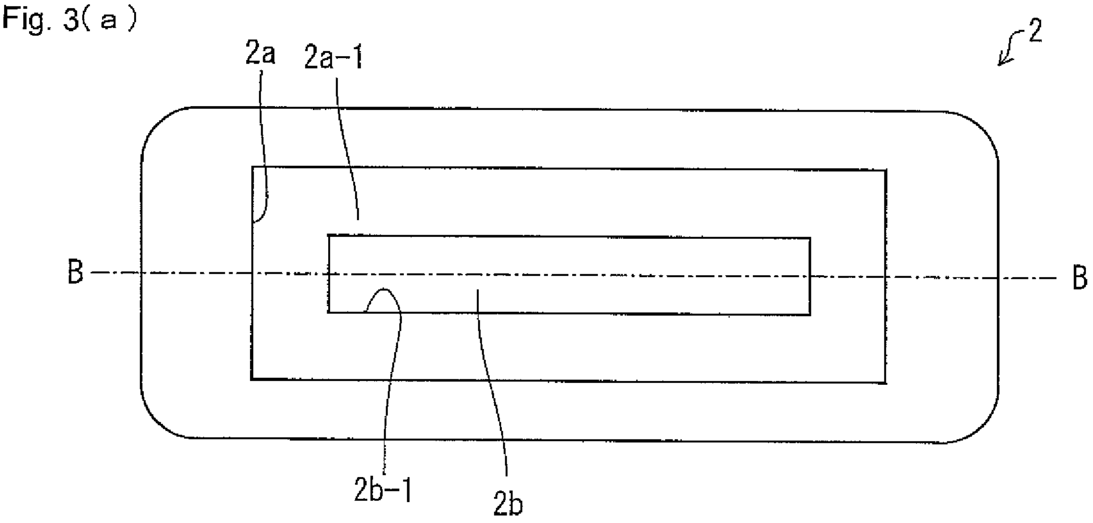
FIG. 3 shows an embodiment of the present invention, FIG. 3 (*a*) is a plan view of a housing, and FIG. 3 (*b*) is a cross-sectional view taken along the line B-B of FIG. 3 (*a*).
Figure 3B:
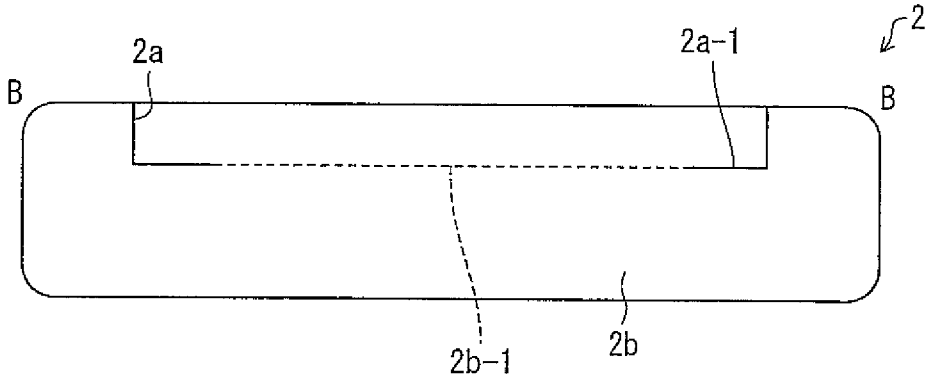

FIG. 3 illustrates a configuration of the housing 2 to which the display sheet 1 is bonded. FIG. 3 (*a*) is a plan view of the housing 2, and FIG. 3 (*b*) is a cross-sectional view of the housing 2 taken along the line B-B that is a central line.

The housing 2 is, for example, a PBT (polybutylene terephthalate) resin molding, and has a recess 2*a* recessed from a top surface side towards a depth direction and an inner hollow space 2*b*.

The recess 2*a* has a bottom surface 2*a*-1 which serves as a portion to which the display sheet 1 is bonded. Further, the bottom surface 2*a*-1 is provided with an opening 2*b*-1 through which the inner hollow space 2*b* is opened to an outside.

In FIG. 3 (*a*), both of the recess 2*a* and the opening 2*b*-1 have a rectangular shape, but both of the recess 2*a* and the opening 2*b*-1 can have any shape. Note that the housing 2 need not necessarily have the inner hollow space 2*b* and the opening 2*b*-1.

Figure 4A:
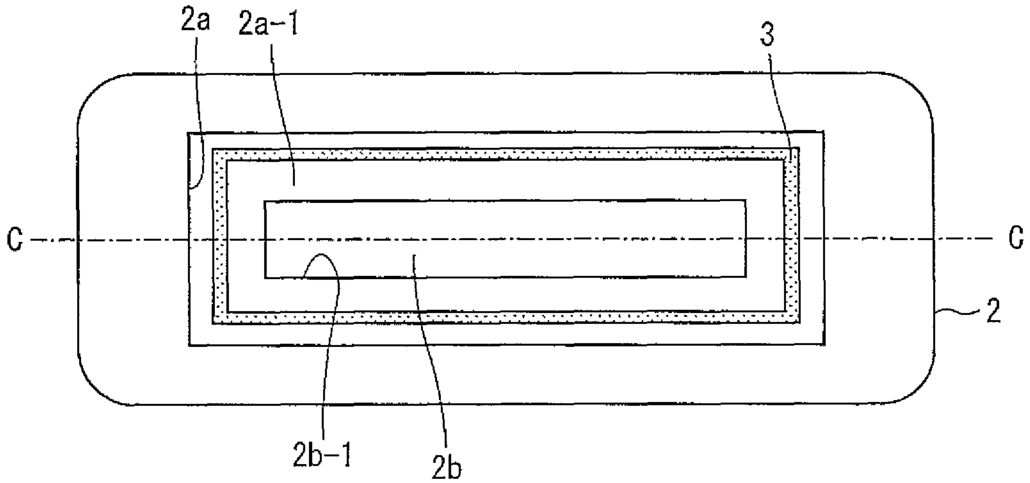
FIG. 4 shows an embodiment of the present invention, FIG. 4 (*a*) is a plan view illustrating a state in which the UV curable adhesive is applied to the housing, and FIG. 4 (*b*) is a cross-sectional view taken along the line C-C of FIG. 4 (*a*).
Figure 4B:
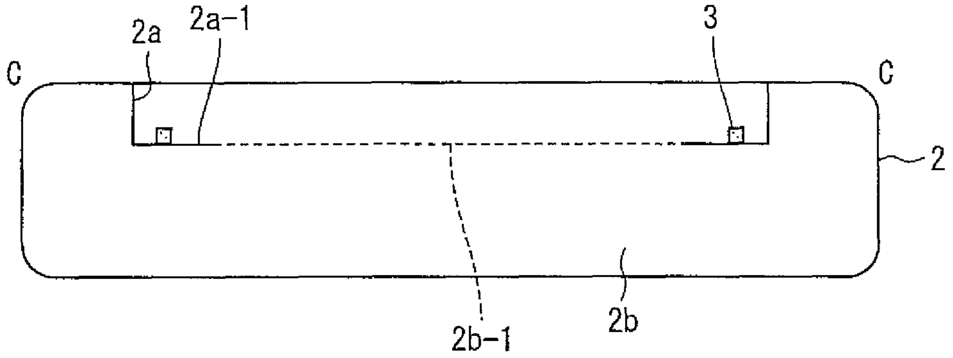

FIG. 4 illustrates a step of applying an adhesive 3 to the housing 2. FIG. 4 (*a*) is a plan view illustrating a state in which the adhesive 3 is applied to the housing 2, and FIG. 4 (*b*) is a cross-sectional view taken along the line C-C that is a central line of FIG. 4 (*a*).

In the present embodiment, a UV curable adhesive is used. An adhesive that can be used as the UV curable adhesive is an adhesive which at least contains (i) one or more resin selected from the group consisting of acrylate resin, methacrylate resin, epoxy resin, and vinyl ether resin and (ii) a photopolymerization initiator.

For example, the UV curable adhesive is an adhesive in which (i) a reactive diluent such as an acrylate monomer, (ii) a photopolymerization initiator such as an alkylphenone photopolymerization initiator or an acylphosphine oxide photopolymerization initiator, and (iii) other additives are mixed in a base resin such as modified acrylate.

In the present embodiment, X-8181 produced by Kyoritsu Chemical & co., ltd. was used as the UV curable adhesive. The UV curable adhesive having the constituent components as described above has a UV curable property, i.e., is cured when irradiated by ultraviolet light.

The adhesive 3 is in a liquid form before it is applied to the housing 2. The adhesive 3 is applied to a part of or all of the bottom surface 2*a*-1 of the recess 2*a* provided in the housing 2. In the present embodiment, for example, 50 mg of the adhesive 3 is applied to an area within the bottom surface 2*a*-1 so as to form a rectangular ring shape surrounding the opening 2*b*-1.

Figure 5A:
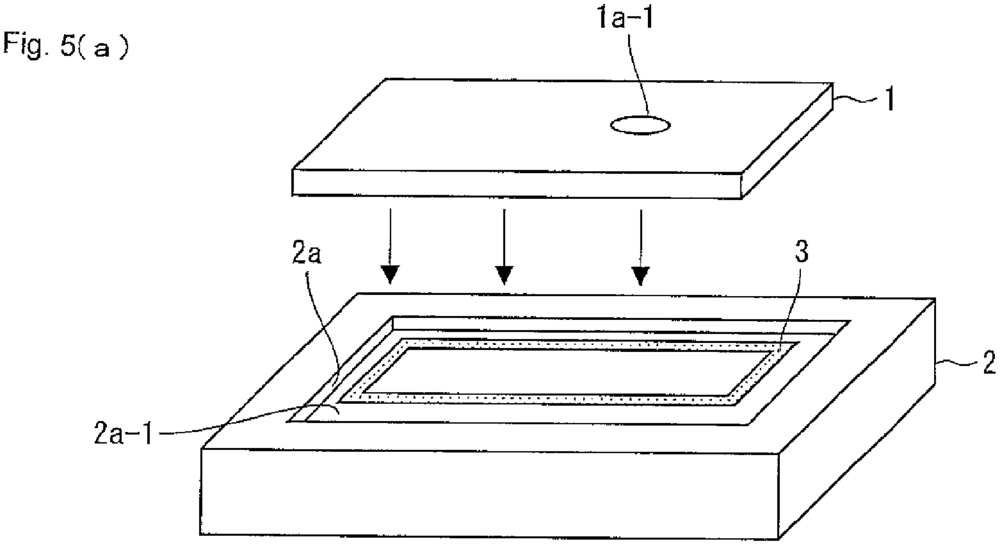
FIG. 5 shows an embodiment of the present invention, FIG. 5 (*a*) is a perspective view explaining a step of attaching the display sheet to the housing, FIG. 5 (*b*) is a plan view of a processed member produced by attaching the display sheet to the housing, and FIG. 5 (*c*) is a cross-sectional view taken along the line D-D of FIG. 5 (*b*).
Figure 5B:
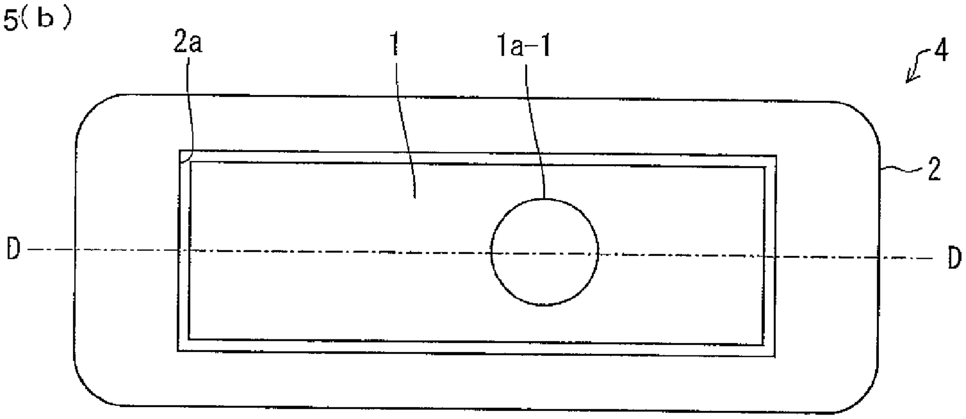
Figure 5C:
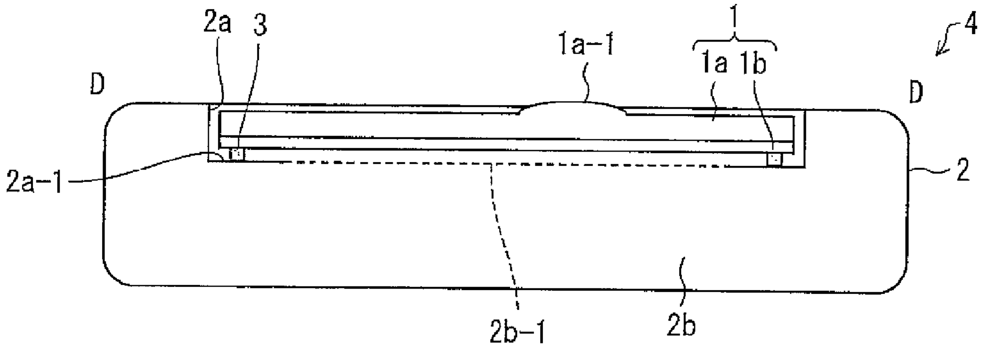

FIG. 5 illustrates a step (first step) of attaching the display sheet 1 to the housing 2 to which the adhesive 3 has been applied.

FIG. 5 (*a*) is a perspective view illustrating a state in which the display sheet 1 is placed within the recess 2*a* of the housing 2. FIG. 5 (*b*) is a plan view illustrating a state in which the display sheet 1 has been attached to the housing 2 via the adhesive 3. FIG. 5 (*c*) is a cross-sectional view of the housing 2 of FIG. 5 (*b*) taken along the line D-D that is a central line.

As illustrated in FIG. 5 (*a*), the display sheet 1 is placed within the recess 2*a* of the housing 2 so that a surface of the switch dome 1*a*-1 which surface is opposite to a bulging surface faces the surface to which the adhesive 3 is applied. This operation can be carried out manually, but may be carried out with the use of a film bonding device. That is, automation of this operation is possible by using the film bonding device.

After the display sheet 1 is placed within the recess 2*a*, an appropriate pressure is applied to the display sheet 1 from a top surface side. This produces a processed member 4 in which the display sheet 1 is attached to the housing 2, as illustrated in FIGS. 5 (*b*) and 5 (*c*).

A depth of the recess 2*a* of the housing 2 is appropriately set, and can be almost equal to an entire thickness of the display sheet 1 as illustrated in FIG. 5 (*c*). In this case, it is possible to improve appearance of the processed member 4 or a final product (e.g., stopwatch) and to make the bonding step relatively easy.

In a case where the adhesive 3 is applied so as to surround the opening 2*b*-1 as illustrated in FIG. 4, the display sheet 1 covers the opening 2*b*-1 of the housing 2 in a state in which the display sheet 1 is attached to the housing 2, as illustrated in FIGS. 5 (*b*) and 5 (*c*).

In the step of bonding the display sheet 1 to the housing 2, the step of attaching the display sheet 1 to the housing 2 via the adhesive 3 including the step of FIG. 4 and the step of FIG. 5 is referred to as a first step.

Next, a second step which is carried out after the first step in the bonding step is described with reference to Examples. The second step is a step of irradiating the display sheet 1 attached to the housing 2 with an ultraviolet light so as to cure the adhesive 3.

Example 1

FIG. 6 illustrates a configuration of an ultraviolet light emitting apparatus 10 that is used to irradiate the display sheet 1 with ultraviolet light in the second step. FIG. 6 (*a*) is a perspective view illustrating the ultraviolet light emitting apparatus 10, FIG. 6 (*b*) is a side view illustrating the ultraviolet light emitting apparatus 10, and FIG. 6 (*c*) is a top view illustrating the ultraviolet light emitting apparatus 10.

The ultraviolet light emitting apparatus 10 is, for example, a conveyor type apparatus, and includes a light source 11, a conveyor 12, and a cooling blower 13.

The light source 11 includes a light source 11*a*, a cold mirror 11, and a lamp house 11*c* in which the light source 11*a* and the cold mirror 11 are stored. The light source 11*a* is an ultrahigh pressure mercury lamp, and emits, for example, light having a wavelength in a range from 300 nm to 400 nm which includes ultraviolet light.

The cold mirror 11*b* reflects, out of ultraviolet light emitted from the light source 11*a*, ultraviolet light that is not directly applied to an object to be irradiated, so as to guide the ultraviolet light to a focal point. Ultraviolet light that is directly applied from the light source 11*a* to the object to be irradiated and the ultraviolet light that is reflected by the cold mirror 11*b* combine to constitute an ultraviolet light flux that is directed towards the object to be irradiated.

The conveyor 12 carries the object to be irradiated so that the object to be irradiated passes directly below the light source 11. The cooling blower 13 carries out cooling blow such as air blow, from a space diagonally above the object to be irradiated, towards the object to be irradiated that has passed directly below the light source 11. Thus, the cooling blower 13 cools the object to be irradiated. The cooling blower 13 may blow an inactive gas instead of the air so that an irradiated surface of the object to be irradiated is not activated carelessly.

An irradiation distance between the light source lamp 11*a* and the object to be irradiated is variable, for example, within a range from several centimeters to several tens of centimeters. An output of the light source lamp 11*a* is variable, for example, in the order of kW. An irradiation time of the ultraviolet light can be set arbitrarily, and is appropriately determined depending on a relation between a carrying speed of the conveyor 12 and the output of the light source lamp 11*a*.

The irradiation time of the ultraviolet light (curing time of the adhesive 3) is set to be, for example, within a range from approximately 10 seconds to 30 seconds. The light source lamp 11*a* according to one or more embodiments of the present invention includes a forced cooling mechanism utilizing air cooling, water cooling, or the like so that a fluctuation in output of the light source lamp 11*a* hardly occurs during the irradiation time. Note that the cooling blower 13 need not be necessarily provided.

In the present Example, GRANDAGE ECS-401GX produced by TAKEDEN CORPORATION was used as the ultraviolet light emitting apparatus 10. The output and the irradiation distance of the light source lamp 11*a* were set so that ultraviolet light illumination became 250 $mW/cm^2$ and ultraviolet light irradiated amount became 3000 $mJ/cm^2$. The irradiation time (curing time) of the ultraviolet light was set to 15 seconds.

Figure 7A:
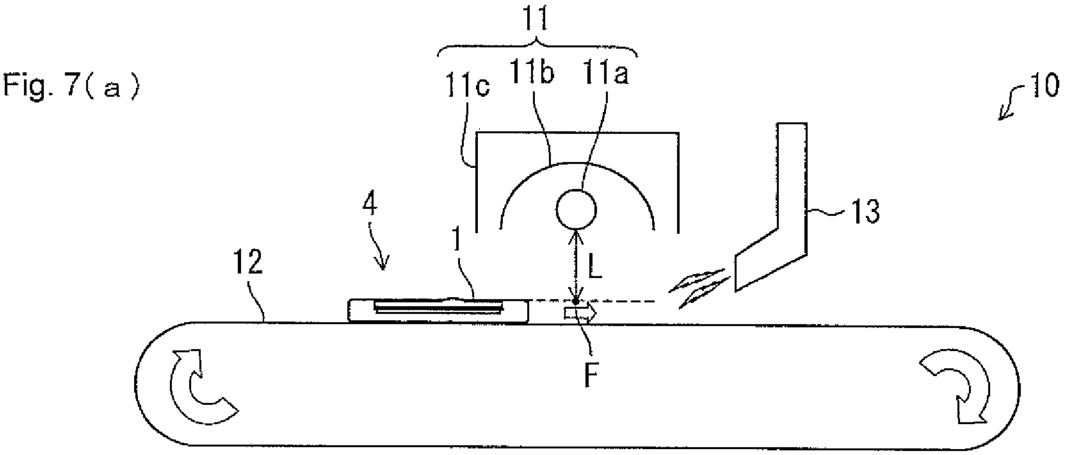
FIG. 7 shows an embodiment of the present invention, FIG. 7 (*a*) is a side view explaining a step of causing the ultraviolet light emitting apparatus to irradiate the display sheet with ultraviolet light, and FIG. 7 (*b*) is a top view illustrating the step of causing the ultraviolet light emitting apparatus to irradiate the display sheet with ultraviolet light.
Figure 7B:
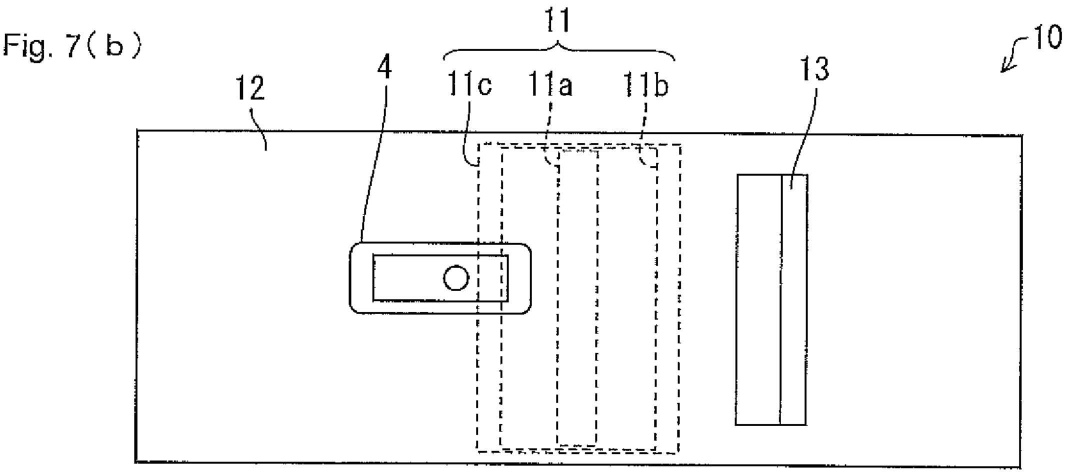

FIG. 7 illustrates a step of causing the ultraviolet light emitting apparatus 10 to irradiate the display sheet 1 with ultraviolet light. FIG. 7 (*a*) is a side view illustrating a state in which the processed member 4 is carried by the conveyor 12, and FIG. 7 (*b*) is a top view of FIG. 7 (*a*). For the convenience of illustration, the light source 11 is shown by the broken line.

In FIG. 7, an object to be irradiated by the ultraviolet light is the processed member 4, especially the display sheet 1. Accordingly, as shown in FIG. 7 (*a*), an irradiation distance L of the ultraviolet light is a distance between the light source lamp 11*a* and a surface of the display sheet 1 which passes directly below the light source lamp 11*a*. A horizontal line connecting feet of perpendicular lines extended from the light source lamp 11*a* to the surface of the display sheet 1 is perpendicular to a carrying direction of the conveyor 12 and represents a focal point F of the ultraviolet light flux.

A height (level) of the focal point F is adjusted, for example, by adjusting a position of the lamp house 11*c* in a vertical direction so as to move the light source lamp 11*a* and the cold mirror 11*b* in the vertical direction.

Figure 8A:
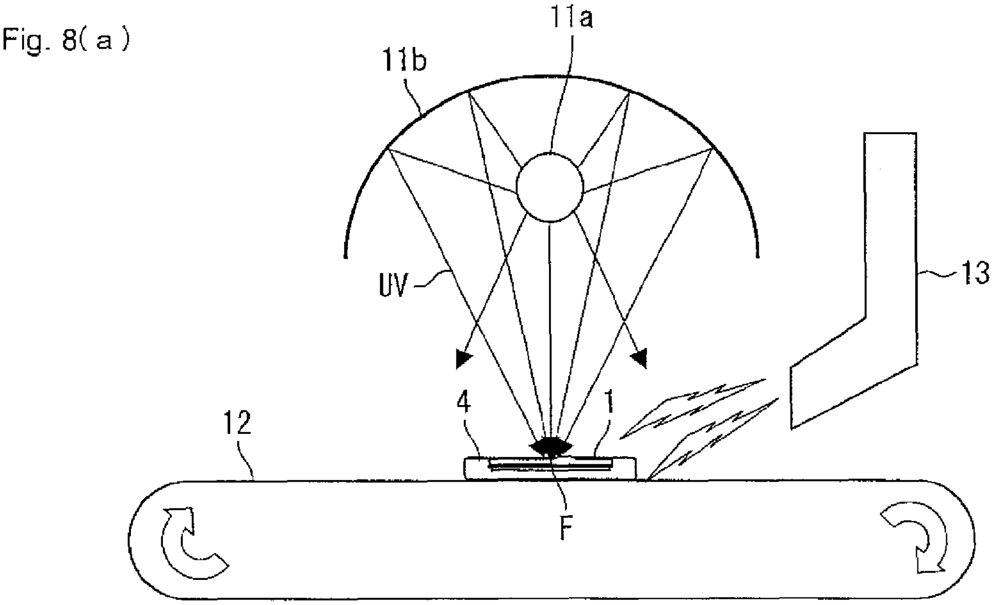
FIG. 8 shows an embodiment of the present invention, FIG. 8 (*a*) is a side view illustrating an ultraviolet light flux emitted by the ultraviolet light emitting apparatus towards the display sheet, and FIG. 8 (*b*) is a graph showing a distribution of ultraviolet light illumination at each position of the display sheet that is being carried.
Figure 8B:
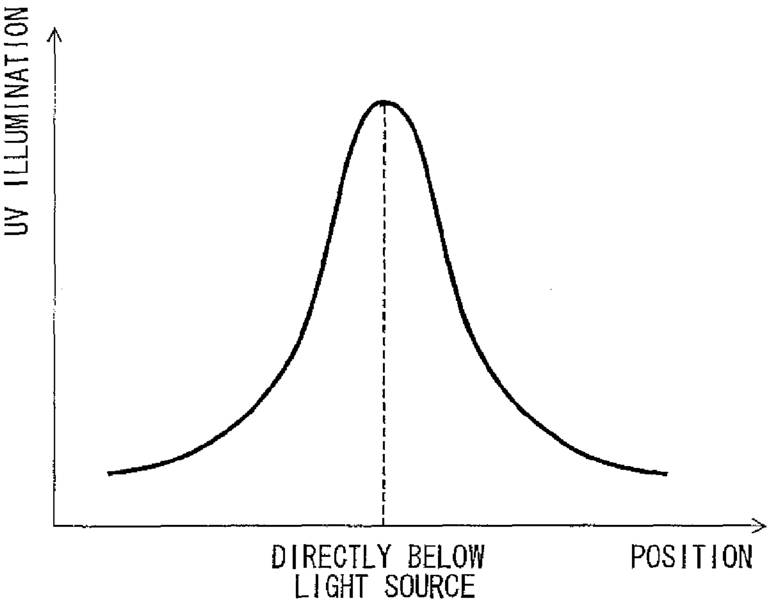

FIG. 8 is a diagram explaining a state in which the processed member 4 passes directly below the light source lamp 11*a*. FIG. 8 (*a*) illustrates a state in which the display sheet 1 that passes directly below the light source lamp 11*a* is irradiated with an ultraviolet light flux UV from an external surface side of the display sheet 1.

The ultraviolet light flux UV is a light flux in which the ultraviolet light that is directly applied to the display sheet 1 from the light source lamp 11*a* and the ultraviolet light that is reflected by the cold mirror 11*b* are combined. Since the focal point F is set on the surface of the display sheet 1 that is positioned directly below the light source lamp 11*a*, the surface of the display sheet 1 can be highly efficiently irradiated by the ultraviolet light.

FIG. 8 (*b*) shows a relationship between a position of the processed member 4 that is being carried by the conveyor 12 and ultraviolet light illumination in a corresponding part of the surface of the display sheet 1. When the processed member 4, i.e., the display sheet 1 is located directly below the light source (directly below the light source lamp 11*a*), the ultraviolet light illumination becomes maximum. The ultraviolet light illumination has a Gaussian distribution, i.e., exponentially declines as a distance from the position directly below the light source becomes larger.

Figure 1:
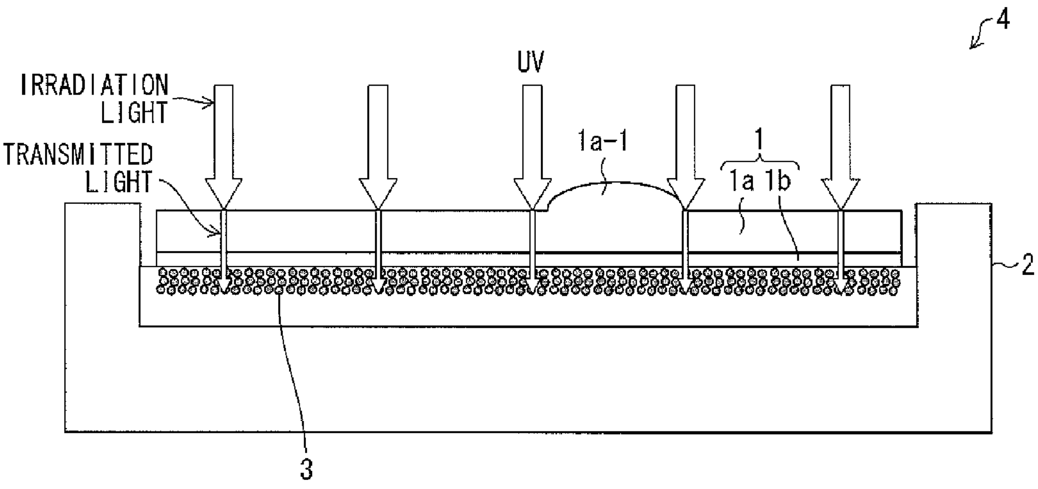
FIG. 1 shows an embodiment of the present invention and is a cross-sectional view illustrating a state in which a UV curable adhesive is cured due to ultraviolet light that has passes through a non-transparent part of the display sheet.

The ultraviolet light flux UV thus applied to the display sheet 1 passes through the display sheet 1 and reaches the adhesive 3 as illustrated in FIG. 1. FIG. 1 is a cross-sectional view illustrating a state in which the adhesive 3 is cured by the ultraviolet light that has passed through the ink layer 1*b* which is the non-transparent part of the display sheet 1. FIG. 1 shows a cross-section of the processed member 4 taken not along the central line but along the area to which the adhesive 3 is applied, so as to show how the adhesive 3 is cured.

The ultraviolet light flux UV which has entered, as irradiation light, the display sheet 1 sequentially passes through, as transmitted light in the display sheet 1, the base material layer 1*a*, which is a transparent part, and the ink layer 1*b*, which is a non-transparent part. The ultraviolet light supplied to the adhesive mainly causes polymerization reaction such as radical polymerization reaction, and thus the adhesive is cured. Accordingly, it is possible to sufficiently cure the adhesive 3 even in a case where the display sheet 1 is not provided with a transparent part for transmission of ultraviolet light which leads to the adhesive 3.

As described above, in the present Example, in the second step, the adhesive 3, which is a UV curable adhesive, is cured by (i) causing the ultraviolet light emitting apparatus 10 to irradiate, from the external surface side of the display sheet 1, the display sheet 1 attached to the housing 2 with ultraviolet light, and (ii) causing the ultraviolet light to pass through the non-transparent part of the display sheet 1.

Although FIG. 1 shows an example in which the ultraviolet light passes through an entire region of the ink layer 1*b*, i.e., the non-transparent part, the present embodiment is not limited to this. It is also possible that the ultraviolet light passes through a part of the non-transparent part.

In a case where the non-transparent part has an area made of a material which hardly transmits the ultraviolet light or does not transmit the ultraviolet light at all (e.g., material having ultraviolet light transmittance of lower than 3%), such a method of causing the ultraviolet light to pass through only a part of the non-transparent part is effective.

As described above, in the present Example, by causing the ultraviolet light to pass through the non-transparent part, the UV curable adhesive is cured, and thus the display sheet 1 is bonded to the housing 2. This reduces the number of steps depending on manual operation, thereby making it possible to carry out the bonding step easily in a very short period of time.

Moreover, since the step is easily carried out, high bonding quality can be achieved stably. This makes it possible to prevent damage on a part (e.g., embossed part) provided for improvement of appearance.

Further, it is possible to hold down the material cost and the processing cost. Furthermore, since the adhesive 3 is a UV curable adhesive, it is easy to secure waterproofness of an area to which the display sheet 1 is bonded.

Further, since the UV curable adhesive turns into a cured product, there is little risk of causing troubles such as moisture absorption, dissolution, and outgassing.

Furthermore, since the thickness of the adhesive 3 can be made very thin unlike the double-sided adhesive tape, it is possible to improve appearance.

Moreover, since the adhesive 3 is in a liquid form before it is applied, an area to which the adhesive 3 is applied can have a wide variety of shapes. Accordingly, the display sheet 1 can be stably bonded regardless of the shape of the display sheet 1.

Further, even if the display sheet 1, especially the base material layer 1*a* does not have heat resistance, i.e., is thermoplastic, only a thermal load that occurs due to the ultraviolet light emission from the light source 11 is applied to the display sheet 1 and the base material layer 1*a*.

Accordingly, the thermal load applied to the display sheet 1 is much lower than a thermal load applied to a thermosetting adhesive. This allows use of a general film as the base material layer 1*a*. Even in a case where the display sheet 1 includes a thermoplastic film, use of the UV curable adhesive allows a thermal load applied to the display sheet 1 to be small, and therefore the display sheet 1 is unlikely to be deformed.

It is thus possible to improve the bonding step using a double-sided adhesive tape or a thermosetting adhesive.

Example 2

In the present Example, the second step is carried out by causing an ultraviolet light emitting apparatus 10 (see FIG. 9) obtained by adding a metal plate 14 to the configuration of FIG. 6 to irradiate a processed member 4 that is produced in a similar manner to FIGS. 4 and 5.

The metal plate 14 is a flat plate, and is made of a material selected from metals such as stainless (SUS), aluminum (Al), silicon (Si), titanium, and tungsten (W). The metal plate 14 according to one or more embodiments of the present invention has metallic luster, and may be one that has been subjected to metal surface treatment.

Figure 9:
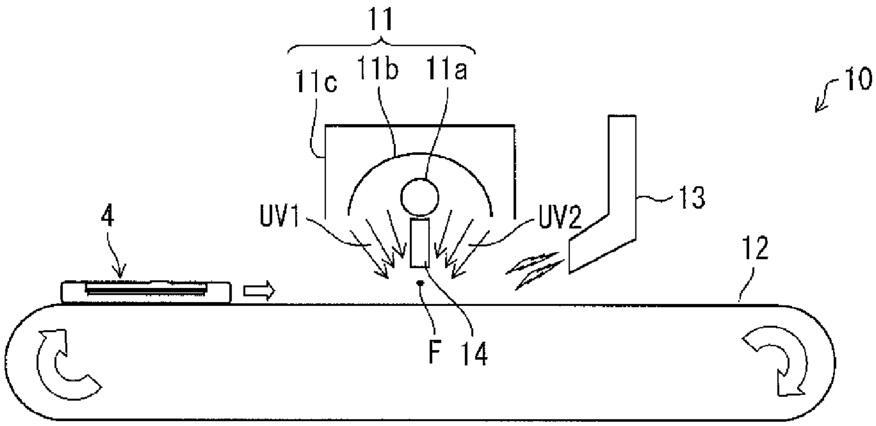
FIG. 9 shows an embodiment of the present invention, and is a side view explaining a step of causing an ultraviolet light emitting apparatus which includes a metal plate to irradiate the display sheet with ultraviolet light.

The metal plate 14 divided the ultraviolet light flux UV to be applied to the object to be irradiated illustrated in FIG. 8 into two light fluxes. i.e., a light flux UV1 and a light flux UV2 as illustrated in FIG. 9. Both of the ultraviolet light flux UV1 and the ultraviolet light flux UV2 are supplied to the object to be irradiated.

The metal plate 14 is disposed directly below the light source lamp 11*a* so that a surface of the metal plate 14 extends in a vertical direction and in a direction perpendicular to a carrying direction of the conveyor 12. Accordingly, the metal plate 14 is disposed so that a focal point F of the ultraviolet light flux UV achieved in a case where the metal plate 14 is not provided is located on a plane including the surface of the metal plate 14.

Although a thickness of the metal plate 14 is exaggerated in FIG. 9, the thickness of the metal plate 14 is actually very small (e.g., approximately 0.1 mm to 1 min) as compared with the irradiation distance L shown in FIG. 7. Accordingly, the metal plate 14 can be deemed to exist on an almost single plane.

Since the metal plate 14 is disposed in the above position, the light flux UV1 becomes a light flux that is directed to an upstream side of the carrying direction from the metal plate 14, and the light flux UV2 becomes a light flux that is directed to a downstream side of the carrying direction from the metal plate 14.

Figure 10A:
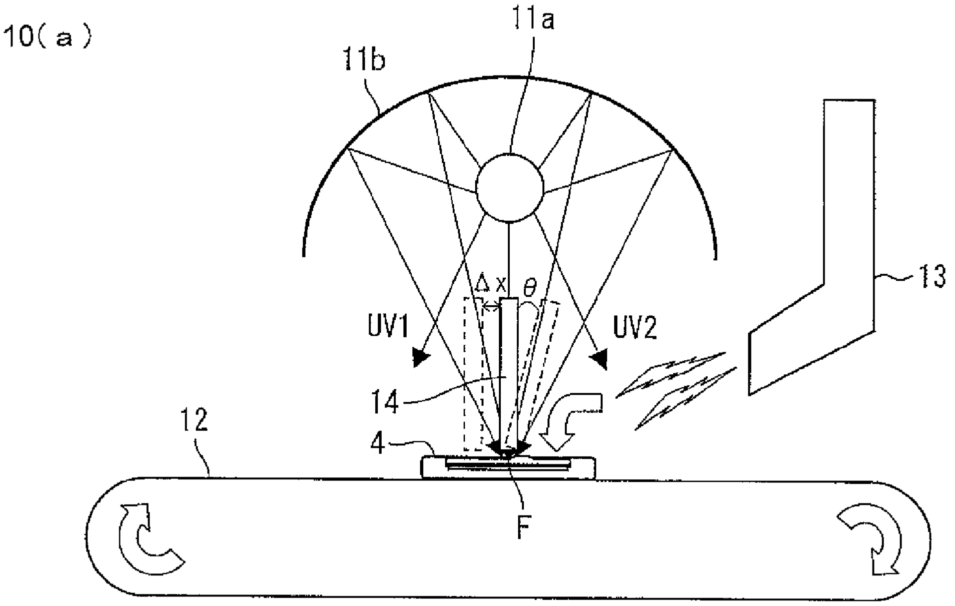
FIG. 10 shows an embodiment of the present invention, FIG. 10 (*a*) is a side view explaining a state in which an ultraviolet light flux emitted to the display sheet is divided by the ultraviolet light emitting apparatus which includes the metal plate, and FIG. 10 (*b*) is a graph showing a distribution of ultraviolet light illumination at each position of the display sheet that is being carried.
Figure 10B:
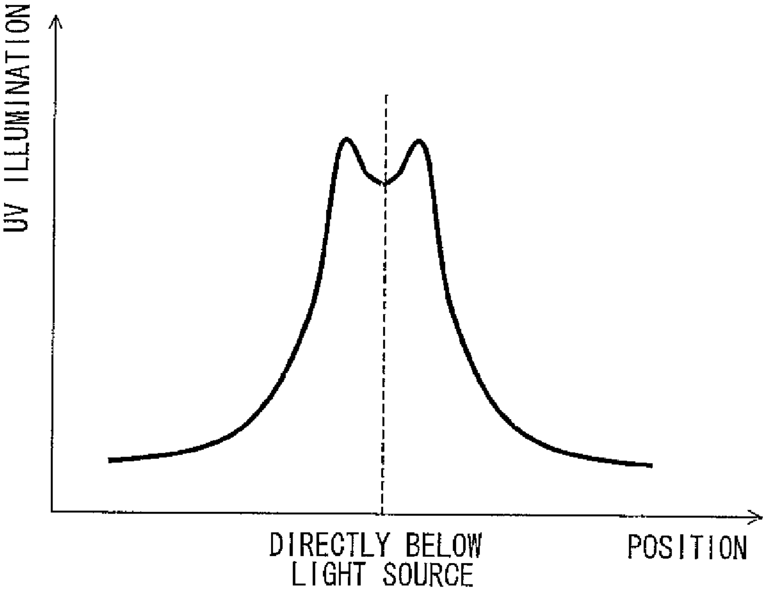

In this case, as illustrated in FIGS. 9 and 10 (*a*), a large part of the light flux UV1 and the light flux UV2 is reflected by the metal plate 14 before concentrating onto the focal point F, and scattered light of the light flux UV1 is directed towards an area on the upstream side of the carrying direction and scattered light of the light flux UV2 is directed towards an area on the downstream side of the carrying direction.

FIG. 10 (*b*) shows a distribution of ultraviolet light illumination obtained in this case on each part of the surface of the display sheet 1. The ultraviolet light illumination in an area directly below the light source, i.e., directly below the metal plate 14 is lower than that of FIG. 8 (*b*), and the ultraviolet light illumination has a maximum value in two areas, i.e., (i) an area on the upstream side of the carrying direction from the area directly below the light source and (ii) an area on the downstream side of the carrying direction from the area directly below the light source. Total energy applied to the object to be irradiated in this distribution is almost the same as total energy applied to the object to be irradiated in the distribution of FIG. 8 (*b*).

As a result, it is possible to avoid the ultraviolet light from concentrating onto the position of the focal point F. This produces an effect that an amount of ultraviolet light to be applied to the display sheet 1 is time-averaged throughout the surface of the display sheet 1, i.e., effect that an amount of energy to be applied to the display sheet 1 is time-averaged throughout the surface of the display sheet 1.

The metal plate 14 therefore serves as a heat shielding plate for shielding, from heat, the housing 2 including the display sheet 1 which is an object to be irradiated. Since an amount of energy to be applied to the display sheet 1 is time-averaged, it is possible to prevent overheat of the display sheet 1 and to form a good-quality bonding part since curing of the adhesive 3 progresses well.

That is, strong light can be applied to the object to be irradiated while keeping the temperature low. This makes it possible to make the bonding by the adhesive 3 strong. Further, Since it is possible to avoid overheat caused by concentration of ultraviolet light onto the focal point F, it is possible to prevent a bad influence on appearance such as yellowing.

It is only necessary that the metal plate 14 divide at least the ultraviolet light flux UV to be applied to the object to be irradiated. Accordingly, the metal plate 14 need not necessarily divide ultraviolet light flux that does not reach the object to be irradiated.

The ultraviolet light flux that does not reach the object to be irradiated is, for example, an ultraviolet light flux which deviates from the processed member 4 in a direction perpendicular to the carrying direction so as to reach the conveyor 12. In a case where even the housing 2 is shielded from heat as in the above example, an extremely low heat resistant material can be used as the housing 2.

The way in which the metal plate 14 is disposed so as to divide the ultraviolet light flux UV to be applied to the object to be irradiated is not limited to the above first arrangement in which the metal plate 14 is disposed directly below the light source so that the surface of the metal plate extends in a direction perpendicular to the vertical direction and the carrying direction of the conveyor 12. Instead of the first arrangement, the following arrangements (see FIG. 10 (*a*)) are also possible.

For example, a second arrangement is possible in which the metal plate 14 is tilted by an angle of θ from the first arrangement with respect to the line on which the focal point F is provided. Moreover, a third arrangement is possible in which the metal plate 14 is moved in parallel from the first arrangement by a distance Ax in the carrying direction.

Moreover, a fourth arrangement is possible in which the metal plate 14 is rotated about a vertical axis by a desired angle in the first arrangement, the second arrangement or the third arrangement. Even with the second arrangement, the third arrangement, and the fourth arrangement, the ultraviolet light flux UV applied to the object to be irradiated is divided by the metal plate 14. It is therefore possible to prevent the whole ultraviolet light from concentrating onto the focal point F, thereby preventing overheat of the object to be irradiated.

In the present Example, the cooling blower 13 blows an air towards the surface of the metal plate 14 from the downstream side of the carrying direction as illustrated in FIG. 10 (*a*). The supplied air which serves as a cooling medium descends along the surface of the metal plate 14, and efficiently cools the processed member 4 that has moved from a position directly below the light source to the downstream side of the carrying direction.

This makes it possible to further suppress a rise in temperature of the processed member 4, especially the display sheet 1 that is heated due to the ultraviolet light emission. This effect can be obtained in varying degrees also by the other arrangements described above. Note that the cooling blow by the cooling blower 13 need not necessarily be carried out since the metal plate 14 alone can produce an overheat preventing effect.

Figure 11:
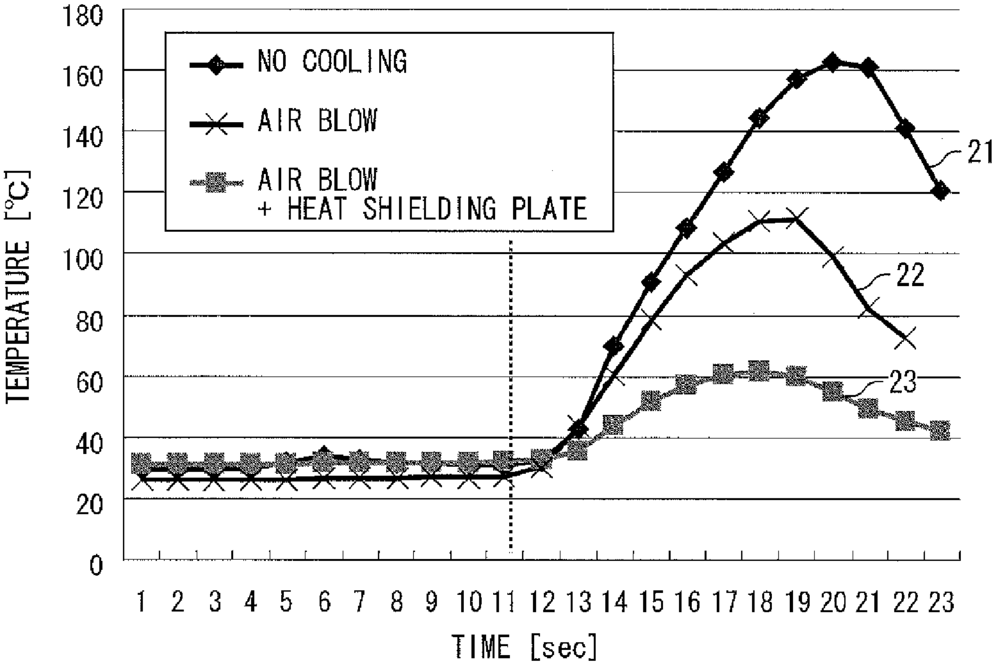
FIG. 11 shows an embodiment of the present invention, and is a graph showing how temperature of the display sheet changes depending on a period of time from the start of carrying of the display sheet.

FIG. 11 shows how temperature of the display sheet 1 changes according to the ultraviolet light irradiation method of FIG. 9 in comparison with the other methods. The horizontal axis represents a period of time elapsed from the start of the transfer by the conveyor 12, and the vertical axis represents the temperature of the display sheet 1. As the metal plate 14, a stainless plate having a thickness of 500 μm is used. An irradiation time of the ultraviolet light (curing time) is set to 15 seconds.

The curve 21 shows how the temperature of the display sheet 1 changes according to the ultraviolet light irradiation method of FIG. 7 which is not accompanied by the cooling blow, the curve 22 shows how the temperature of the display sheet 1 changes according to the ultraviolet light irradiation method of FIG. 7 which is accompanied by the air blow, and the curve 23 shows how the temperature of the display sheet changes according to the ultraviolet light irradiation method of FIG. 9 accompanied by the air blow in which the metal plate (heat shielding plate) 14 is provided.

The processed member 4 carried by the conveyor 12 passes directly below the light source approximately 11 seconds later, and after some delay, a rise in temperature occurs due to energy supplied from the light source 11. In the curve 21, the temperature rises above 160° C., and in the curve 22, the temperature rises up to the vicinity of 110° C. Meanwhile, in the curve 23 according to the present Example, the temperature rises only to approximately 60° C.

In the present Example, the heat shielding effect produced by the metal plate 14 and the cooling effect produced by the cooling blow utilizing the surface of the metal plate 14 make it possible to keep a rise of the temperature of the processed member 4, especially the display sheet 1 extremely low.

Example 3

In the present Example, the second step is carried out by causing the ultraviolet light emitting apparatus 10 of FIG. 6 to irradiate the processed member 4 that is produced in a similar manner to FIGS. 4 and 5 after an intermediate step (see FIG. 13 (*c*)) is carried out.

In FIGS. 4 and 5, an example in which the display sheet 1 is attached to the housing 2 having the inner hollow space 2*b* so as to cover the opening 2*b*-1 is described. In this case, the inner hollow space 2*b* is hermetically sealed by the display sheet 1 in the first step. Accordingly, if an air trapped in the inner hollow space 2*b* expands due to heat after the first step, the air thus expanded presses the display sheet 1 attached to the housing 2.

Figure 12A:
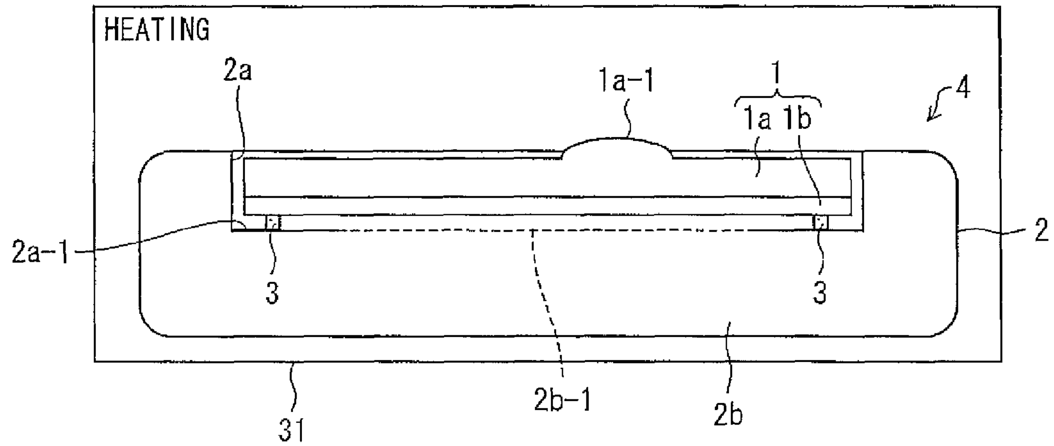
FIG. 12 shows an embodiment of the present invention, FIG. 12 (*a*) is a side view explaining a step of heating a processed member in which the housing has an inner hollow space hermetically sealed by the display sheet, and FIG. 12
Figure 12B:
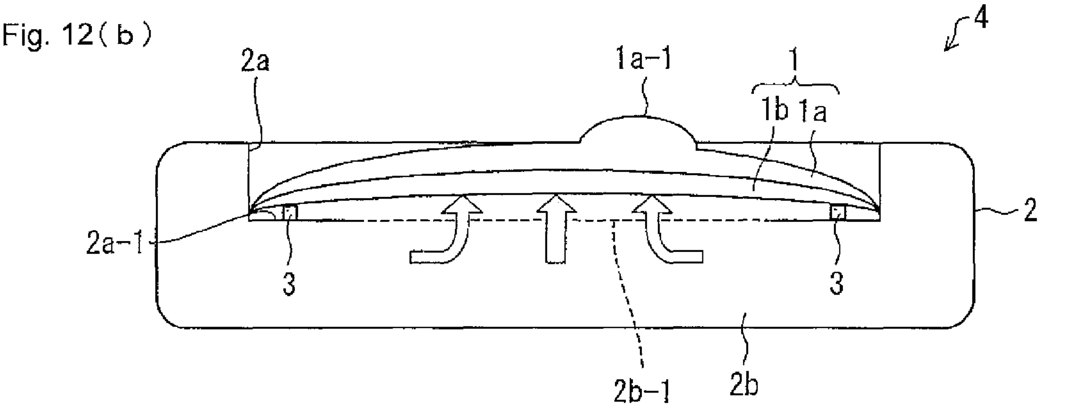
Figure 13A:
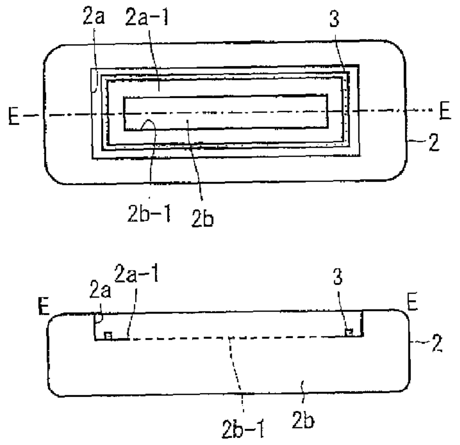
Figure 13B:
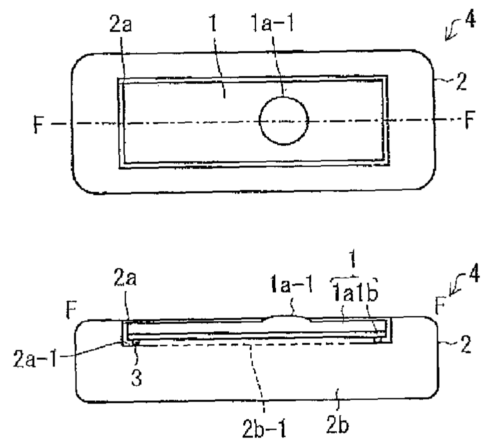
Figure 13C:
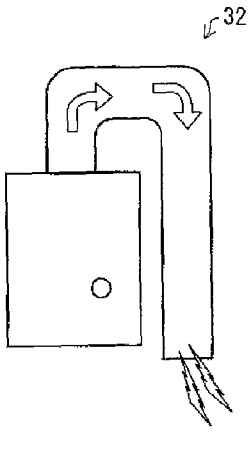
Figure 13D:
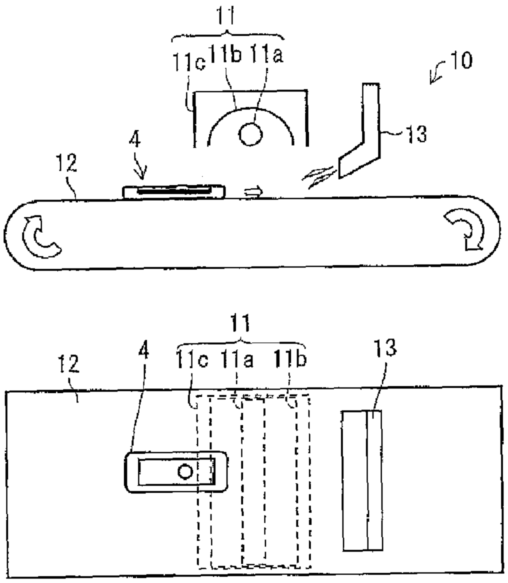

This phenomenon is described below in more detail with reference to FIG. 12. As illustrated in FIG. 12 (*a*), the processed member 4 that is produced in a similar manner to FIGS. 4 and 5 is placed within an oven 31 and heated for the purpose of experimentally applying a thermal load to the processed member 4.

In a case where the thermal load is large, the air trapped in the inner hollow space 2*b* expands due to the heat with time, and the air thus expanded presses up the display sheet 1 from the inner surface side, as illustrated in FIG. 12 (*b*).

This causes the display sheet 1 to thermally expand. Moreover, the display sheet 1 is lifted up by the pressure of the air so as to be curved. In a case where the display sheet 1 is thus curved, adhesion between the display sheet 1 and the adhesive 3 weakens, and finally the display sheet 1 and the adhesive 3 may be detached from each other.

In view of this, in the present Example, the first step illustrated in FIGS. 13 (*a*) and 13 (*b*), the intermediate step illustrated in FIG. 13 (*c*), and the second step illustrated in FIG. 13 (*d*) are carried out sequentially.

The step of FIG. 13 (*a*) is the same as the step of FIG. 4, i.e., the step of applying the adhesive 3 to the housing 2. FIG. 13 (*a*) shows a plan view of the housing 2 to which the adhesive 3 is applied and a cross-sectional view taken along the line E-E which is a central line of the housing 2.

The step of FIG. 13 (*b*) is carried out after the step of FIG. 13 (*a*). The step of FIG. 13 (*b*) is the same as the step shown in FIG. 5, i.e., the step of attaching the display sheet 1 to the housing 2. FIG. 13 (*b*) shows a plan view of the processed member 4 produced by attaching the display sheet 1 to the housing 2 and a cross-sectional view taken along the line F-F which is a central line of the processed member 4.

The step of FIG. 13 (*c*) is carried out after the step of FIG. 13 (*b*). The step of FIG. 13 (*c*) is a step of cooling the processed member 4 with the use of a cooling system 32 such as a spot cooler. The cooling system 32 may be one which supplies a cool fluid to the processed member 4 or may be a cooler which keep temperature of atmosphere of the processed member 4 low.

The step of FIG. 13 (*d*) is carried out after the step of FIG. 13 (*c*). The step of FIG. 13 (*d*) is a step of UV-curing the adhesive 3 with the use of the ultraviolet light emitting apparatus 10 as shown in FIG. 7.

In a case where the intermediate step in which cooling processing is carried out is interposed between the first step and the second step, the air inside the inner hollow space 2*b* does not expand greatly even under a thermal load applied in the second step since the air inside the inner hollow space 2*b* is cooled in the intermediate step.

Accordingly, deformation such as curvature of the display sheet 1 does not occur, and the display sheet 1 is not detached from the bonding part.

Examples have been thus described.

[Evaluation of Sample]

Next, evaluation of sample apparatuses (processed member 4) produced by performing the first step and the steps described in the Examples was performed. Specifically, a peel strength test for the display sheet 1, a bonding part airtightness (waterproofness) test, and evaluation of appearance and click feeling of the switch dome were performed.

FIG. 14 illustrates a method for performing the peel strength test for the display sheet 1.

As illustrated in FIG. 14, the peel strength test was performed with the use of a force gauge 41 in such a manner that an opening leading to the inner hollow space 2*b* was created in a rear surface of a housing 2 of a sample and then the display sheet 1 was pressed down from the rear surface side of the sample through the opening in the Y direction (vertically downward). By thus pressing down the display sheet 1, the peel strength was measured.

FIG. 15 illustrates a method for performing the bonding part airtightness (waterproofness) test.

As illustrated in FIG. 15, a sample was immersed for 20 hours in a water tank 51 in which water of 60° C. (hot water) is stored to the depth of 20 cm. Thus, it was observed whether or not the water infiltrated into an inner hollow space 2*b* from a bonding part 3*a* using the adhesive 3.

FIG. 16 illustrates a method for performing the evaluation of appearance and click feeling of the switch dome.

As illustrated in FIG. 16, a height (bump height) H of a switch dome 1*a*-1 was measured. Thus, it was examined whether or not good appearance of the display sheet 1 is secured. Further, the click feeling was evaluated by examining whether feeling of pressing the switch dome 1*a*-1 with a finger is good or not.

[Comparative Sample]

In performing the above evaluation of the sample produced according to the present embodiment, the following comparative samples were prepared and evaluated together with the sample.

FIG. 17 illustrates a step of preparing a sample of Comparative Example 1 by bonding the display sheet 1 to the housing 2 with the use of a double-sided adhesive tape. Note that the display sheet 1 and the housing 2 are the same as those used in FIGS. 2 and 3.

As illustrated in FIG. 17 (*a*), a double-sided adhesive tape 61 (thickness: 150 μm) that is processed into a rectangular ring shape is attached to an area within the bottom surface 2*a*-1 of the recess 2*a* of the housing 2. FIG. 17 (*a*) shows a plan view of the housing 2 and a cross-sectional view taken along the line G-G which is a central line of the housing 2.

Next, as illustrated in FIG. 17 (*b*), the display sheet 1 is attached to the area to which the double-sided adhesive tape 61 is attached. Thus, a processed member 62 is prepared. FIG. 17 (*b*) shows a plan view of the processed member 62 and a cross-sectional view taken along the line H-H which is a central line of the processed member 62.

Then, as illustrated in FIG. 17 (*c*), a bonding part of the processed member 62 is pressed with a force of approximately 30N with a finger so that the adhesion of the double-sided adhesive tape 61 comes into effect. Thus, the sample is prepared.

FIG. 18 illustrates a step of preparing a sample of Comparative Example 2 by bonding the display sheet 1 with the use of a thermosetting adhesive. Note that the display sheet 1 and the housing 2 are the same as those used in FIGS. 2 and 3.

As illustrated in FIG. 18 (*a*), a thermosetting adhesive 71 is applied to a similar area of the housing 2 to that of FIG. 4. FIG. 18 (*a*) shows a plan view of the housing 2 and a cross-sectional view taken along the line I-I which is a central line of the housing 2.

Next, as illustrated in FIG. 18 (*b*), the display sheet 1 is attached to the area to which the thermosetting adhesive 71 is applied. Thus, a processed member 72 is prepared. FIG. 18 (*b*) shows a plan view of the processed member 72 and a cross-sectional view taken along the line J-J which is a central line of the processed member 72.

Then, as illustrated in FIG. 18 (*c*), the processed member 72 is heated at 100° C. for 2 hours in an oven 73 so that the thermosetting adhesive 71 is cured. Thus, the sample is prepared.

Further, a sample of Comparative Example 3 (not shown) is prepared by (i) attaching the display sheet 1 to the housing 2 with the use of a moisture curing adhesive in a similar manner to FIGS. 4 and 5 and then (ii) leaving it until the moisture curing adhesive is cured.

[Evaluation Result]

Table 1 and Table 2 show results of the evaluation of the samples prepared according to the present embodiment and the samples of Comparative Example 1 through 3.

Table 1 summarizes results of the evaluation of the samples S1 through S3 according to Examples 1 through 3. The sample S1 was prepared according to Example 1, the sample S2 was prepared according to Example 2, and the sample S3 was prepared according to Example 3. Table 2 summarizes results of the evaluation of the samples R1 through R3 of Comparative Example 1 through 3. The sample R1 was prepared according to Comparative Example 1, the sample R2 was prepared according to Comparative Example 2, and the sample R3 was prepared according to Comparative Example 3. 20 samples for each of these samples were prepared and evaluated. What is meant by "attaching time" in the item (H) is a time necessary for the step of attaching the display sheet 1 to the housing 2.

TABLE 1

| | | S1 (Example 1) | S2 (Example 2) | S3 (Example 3) |
|---|---|---|---|---|
| Sample preparing conditions | (A) display sheet | PET having thickness of 300 μm White ink Switch dome having height of 1000 μm | PET having thickness of 300 μm White ink Switch dome having height of 1000 μm | PET having thickness of 300 μm White ink Switch dome having height of 1000 μm |
| | (B) housing | PBT molding | PBT molding | PBT molding |
| | (C) bonding member | UV curable adhesive | UV curable adhesive | UV curable adhesive |
| | (D) curing condition | Conveyor type Ultraviolet light emitting apparatus | Conveyor type Ultraviolet light emitting apparatus + heat shielding plate | Conveyor type Ultraviolet light emitting apparatus + cooling before irradiation |
| Evaluation result | (E) peel strength | 108N | 110N | 108N |
| | (F) airtightness | Good 20/20 OK | Good 20/20 OK | Good 20/20 OK |
| | (G) appearance/click feeling | Switch dome having height of 750 μm Good | Switch dome having height of 850 μm Good | Switch dome having height of 850 μm Good |
| | (H) attaching time | Several tens of seconds | Several tens of seconds | Several tens of seconds |

TABLE 2

| | | R1 (Comparative Example 1) | R2 (Comparative Example 2) | R3 (Comparative Example 3) |
|---|---|---|---|---|
| Sample preparing | (A) display sheet | PET having thickness of 300 μm | PET having thickness of 300 μm | PET having thickness of |

TABLE 2-continued

| | | R1 (Comparative Example 1) | R2 (Comparative Example 2) | R3 (Comparative Example 3) |
|---|---|---|---|---|
| conditions | | White ink Switch dome having height of 1000 μm | White ink Switch dome having height of 1000 μm | 300 μm White ink Switch dome having height of 1000 μm |
| | (B) housing | PBT molding | PBT molding | PBT molding |
| | (C) bonding member | Double-sided adhesive tape | Thermosetting adhesive | Moisture curing adhesive |
| | (D) curing condition | Pressed by finger | Heated for 2 hours at 100° C. | Left |
| Evaluation result | (E) peel strength | 40N | 105N | 60N |
| | (F) airtightness | Bad 18/20 OK | Good 20/20 OK | Bad 0/20 OK |
| | (G) appearance/ click feeling | Switch dome having height of 1000 μm Not good | Switch dome having height of 300 μm Not good (thermally deformed) | Switch dome having height of 1000 μm Good |
| | (H) attaching time | Several tens of seconds | Several hours | Several tens of seconds to several minutes |

All of the samples S1 through S3 according to the present embodiment showed a peel strength (the item (E)) of more than 100N, and therefore had a bonding strength sufficient to secure waterproofness. In compliance with this result, as for airtightness in the item (F), all of the 20 samples for each of the samples S1 through S3 showed no infiltration of water. Accordingly, it was revealed that each of the samples S1 through S3 had good airtightness.

As for the item (G), the height of the switch dome 1*a*-1 was 750 μm or more in each of the samples S1 through S3 after completion of all of the steps. That is, it was confirmed that good appearance was achieved. The item (G) also shows that the feeling of clicking the switch dome 1*a*-1 was good in each of the samples S1 through S3.

Although Table 1 shows only samples in which the height of the switch dome in the item (A) was set to 1000 μm, the height of the switch dome is not limited to this. Other samples in which the height of the switch dome 1*a*-1 in the item (A) was set within a range from 500 μm to 1000 μm achieved good appearance, which is represented by the height (degree of deformation) of the switch dome 1*a*-1 achieved after the completion of all of the processes, and good click feeling.

Meanwhile, the sample R1 using the double-sided adhesive tape showed a peel strength of approximately 40N. As for the airtightness, no infiltration of water was observed in 18 out of the 20 samples, but infiltration of water was observed in the remaining 2 samples. Further, the sample R1 was not good in feeling of clicking the switch dome 1*a*-1.

As for the sample R2 using the thermosetting adhesive, deformation of the switch dome 1*a*-1 occurred due to heat during the steps, and the height of the switch dome 1*a*-1 was below 500 μm. Moreover, the sample R2 was not good in feeling of clicking the switch dome 1*a*-1.

The sample R3 using the moisture curing adhesive showed a peel strength of approximately 60N. Moreover, infiltration of water was observed in all of the 20 samples. That is, it was revealed that airtightness could not be secured at all in the sample R3.

The present embodiment has been thus described.

Apparatuses to which one or more embodiments of the present invention is applicable encompasses not only general electronic apparatuses including stopwatch, mobile apparatuses, etc. and every kind of small to large sized electric apparatuses, but also components and devices that are not electrically driven.

One or more embodiments of the present invention also encompasses the following.

A method according to one or more embodiments of the present invention for assembling an apparatus including a display sheet is arranged such that the display sheet includes a thermoplastic film.

According to one or more embodiments of the invention, even in a case where the display sheet includes a thermoplastic film, use of the UV curable adhesive produces an effect that the display sheet is unlikely to deform since a thermal load applied to the display sheet is small.

A method according to one or more embodiments of the present invention for assembling an apparatus including a display sheet is arranged such that said at least a part of the non-transparent part has ultraviolet light transmittance ranging from 3% to 50% to at least a part of a wavelength range of ultraviolet light.

According to one or more embodiments of the invention, an ink layer having ultraviolet light transmittance ranging from 3% to 50% to at least a part of a wavelength range of ultraviolet light can be used as at least a part of the non-transparent part of the display sheet which part transmits the ultraviolet light. It is therefore possible to prepare a display sheet suitable for use of the UV curable adhesive.

A method according to one or more embodiments of the present invention for assembling an apparatus including a display sheet is arranged such that the ultraviolet light emitting apparatus is a conveyor type apparatus which includes a conveyor, an ultraviolet light source, and a metal plate, and in the second step of irradiating, from the external surface side of the display sheet, the display sheet with the ultraviolet light, the conveyor carrying the housing to which the display sheet is attached, and the ultraviolet light source irradiating the display sheet, which is an object to be irradiated carried by the conveyor, with an ultraviolet light flux in such a manner that a surface of the metal plate divides the ultraviolet light flux emitted from the ultraviolet light source.

According to one or more embodiments of the invention, the ultraviolet light flux is divided into two light fluxes by the metal plate, and a large part of the two light fluxes is reflected by the metal plate before reaching the display sheet, and scattered light of one of the two light fluxes is directed to a region corresponding to the one of the two light fluxes, and, separately from the scattered light of the one of the two light fluxes, scattered light of the other one of the two light fluxes is directed to a region corresponding to the other one of the two light fluxes.

Total energy given to the object to be irradiated with the ultraviolet light in an ultraviolet light irradiation distribution obtained in this case is almost the same as total energy given to the object to be irradiated in a case where the metal plate is not provided.

As a result, it is possible to avoid the ultraviolet light from concentrating on the focal point of the ultraviolet light source. This produces an effect that an amount of ultraviolet light to be applied to the display sheet is time-averaged throughout the surface of the display sheet. i.e., effect that an amount of energy to be supplied to the display sheet is time-averaged throughout the surface of the display sheet. The metal plate thus serves as a heat shielding plate for shielding heat from the housing which includes the display sheet which is an object to be irradiated.

In a case where the ultraviolet light emitting apparatus includes the metal plate, an amount of energy to be applied to the display sheet is time-averaged. This makes it possible to prevent overheat of the display sheet and to form a good-quality bonding part since curing of the UV curable adhesive progresses well.

A method according to one or more embodiments of the present invention for assembling an apparatus including a display sheet is arranged such that, in the second step, the metal plate is disposed so that a focal point of the ultraviolet light flux onto the object to be irradiated which focal point is obtained in a case where the metal plate is not provided is located on a plane including the surface of the metal plate.

According to one or more embodiments of the invention, the metal plate divides the ultraviolet light flux into two light fluxes, and a large part of the two light fluxes is reflected by the metal plate before concentrating on a focal point of the ultraviolet light source. It is therefore possible to achieve a distribution in which energy is averaged well, i.e., distribution in which (i) ultraviolet light illumination at a position directly below the light source, i.e., directly below the metal plate is smaller than that achieved in a case where the metal plate is not provided and (ii) the ultraviolet light illumination has a maximum value at two regions to which the two light fluxes are respectively directed.

A method according to one or more embodiments of the present invention for assembling an apparatus including a display sheet is arranged such that, in the second step, the metal plate is disposed so that the surface of the metal plate divides the ultraviolet light flux to be applied to the object to be irradiated into a light flux on an upstream side of a carrying direction of the conveyor and a light flux on a downstream side of the carrying direction, and cooling blow is performed from the downstream side of the carrying direction when viewed from the surface of the metal plate.

According to one or more embodiments of the invention, a cooling medium is blown to the surface of the metal plate from the downstream side of the carrying direction. The cooling medium thus supplied descends along the surface of the metal plate and efficiently cools the display sheet that has moved from the position directly below the light source to the downstream side of the carrying direction. This produces an effect of further suppressing a rise in temperature of the display sheet heated by ultraviolet light emission.

A method according to one or more embodiments of the present invention for assembling an apparatus including a display sheet is arranged such that the housing has an inner hollow space having an opening opened to an outside, in the first step, the display sheet is attached to the housing so that the display sheet closes up the opening, the step (a) further comprising, between the first step and the second step, an intermediate step of cooling the housing to which the display sheet is attached.

According to one or more embodiments of the invention, the intermediate step in which cooling processing is carried out is interposed between the first step and the second step. Accordingly, the air inside the inner hollow space does not expand greatly even under a thermal load applied in the second step since the air inside the inner hollow space is cooled in the intermediate step. Consequently, deformation such as curvature of the display sheet does not occur, and the display sheet is not detached from the bonding part.

A method according to one or more embodiments of the present invention for assembling an apparatus including a display sheet is arranged such that the display sheet includes a switch dome that is connected to an electrical contact inside the housing.

According to one or more embodiments of the invention, since the UV curable adhesive is used, the switch dome has a good height and is not deformed after the bonding step. It is therefore possible to secure good appearance of the display sheet and good click feeling of the switch dome.

The present invention is not limited to the description of the embodiments above, but may be altered by a skilled person within the scope of the claims. An embodiment based on a proper combination of technical means disclosed in different embodiments is encompassed in the technical scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

One or more embodiments of the present invention is suitably applicable to apparatuses to which an identification plate is bonded.

REFERENCE SIGNS LIST

1: Display sheet
1*a*: Base material layer (thermoplastic film)
1*b*: Ink layer (non-transparent part)
2: Housing
2*b*: Inner hollow space
2*b*-1: Opening
3: Adhesive (UV curable adhesive)
4: Processed member (apparatus)
10: Ultraviolet light emitting apparatus
14: Metal plate
UV: Ultraviolet light flux
UV1: Light flux (light flux on upstream side of the carrying direction)
UV2: Light flux (light flux on downstream side of the carrying direction)

The invention claimed is:

1. A method for assembling an apparatus including a display sheet having a non-transparent part in at least a part of the display sheet, comprising:

a bonding step of bonding the display sheet to a housing, wherein the bonding step comprises:

a first step of attaching the display sheet to the housing via a UV curable adhesive; and a second step of causing an ultraviolet light emitting apparatus to irradiate, from an external surface side of the display sheet, wherein the display sheet is attached to the housing with ultraviolet light after the first step so that the ultraviolet light passes through at least a part of the non-transparent part of the display sheet and cures the UV curable adhesive.

2. The method according to claim 1, wherein:

the ultraviolet light emitting apparatus is a conveyor type apparatus which includes a conveyor, an ultraviolet light source, and a metal plate, and in the second step of irradiating, from the external surface side of the display sheet, the display sheet with the ultraviolet light, the conveyor carrying the housing to which the display sheet is attached, and the ultraviolet light source irradiating the display sheet, which is an object to be irradiated carried by the conveyor, with an ultraviolet light flux in such a manner that a surface of the metal plate divides the ultraviolet light flux emitted from the ultraviolet light source.

3. The method according to claim 2, wherein, in the second step, the metal plate is disposed so that a focal point of the ultraviolet light flux onto the object to be irradiated which focal point is obtained in a case where the metal plate is not provided is located on a plane including the surface of the metal plate.

4. The method according to claim 2, wherein:

in the second step, the metal plate is disposed so that the surface of the metal plate divides the ultraviolet light flux to be applied to the object to be irradiated into a light flux on an upstream side of a carrying direction of the conveyor and a light flux on a downstream side of the carrying direction, and cooling blow is performed from the downstream side of the carrying direction when viewed from the surface of the metal plate.

5. The method according to claim 1, wherein the display sheet includes a thermoplastic film.

6. The method according to claim 1, wherein said at least a part of the non-transparent part has ultraviolet light transmittance ranging from 3% to 50% to at least a part of a wavelength range of ultraviolet light.

7. The method according to claim 1, wherein:

the housing has an inner hollow space having an opening opened to an outside, in the first step, the display sheet is attached to the housing so that the display sheet closes up the opening, the bonding step further comprising, between the first step and the second step, an intermediate step of cooling the housing to which the display sheet is attached.

8. The method according to claim 1, wherein the display sheet includes a switch dome that is connected to an electrical contact inside the housing.

* * * * *